United States Patent
You

(10) Patent No.: US 12,189,989 B2
(45) Date of Patent: *Jan. 7, 2025

(54) MEMORY DEVICE QUEUING A PLURALITY OF COMMANDS AND MEMORY SYSTEM HAVING MEMORY DEVICE

(71) Applicant: SK hynix Inc., Gyeonggi-do (KR)

(72) Inventor: Byoung Sung You, Gyeonggi-do (KR)

(73) Assignee: SK hynix Inc., Gyeonggi-do (KR)

( * ) Notice: Subject to any disclaimer, the term of this patent is extended or adjusted under 35 U.S.C. 154(b) by 106 days.

This patent is subject to a terminal disclaimer.

(21) Appl. No.: 17/443,711

(22) Filed: Jul. 27, 2021

(65) Prior Publication Data

US 2021/0357155 A1 Nov. 18, 2021

Related U.S. Application Data

(63) Continuation-in-part of application No. 15/961,031, filed on Apr. 24, 2018, now Pat. No. 11,099,776.

(30) Foreign Application Priority Data

Sep. 20, 2017 (KR) .......................... 10-2017-0121096

(51) Int. Cl.
*G06F 3/06* (2006.01)

(52) U.S. Cl.
CPC .......... *G06F 3/0659* (2013.01); *G06F 3/0604* (2013.01); *G06F 3/0634* (2013.01); *G06F 3/0679* (2013.01)

(58) Field of Classification Search
CPC ...... G06F 3/061; G06F 12/0879; G06F 13/28; G06F 12/0246; G06F 3/0604; G06F 3/0634; G06F 3/0679; G06F 3/0659

USPC ............ 711/158, 103, 154, E12.008, 100, 711/E12.001, E12.009, E12.007, 167
See application file for complete search history.

(56) References Cited

U.S. PATENT DOCUMENTS

| | | | |
|---|---|---|---|
| 6,895,482 B1 * | 5/2005 | Blackmon | G06F 9/3836 712/E9.046 |
| 9,025,608 B2 * | 5/2015 | Chen | H04L 49/9078 370/401 |
| 9,368,166 B2 * | 6/2016 | Kwak | G11C 7/22 |
| 2004/0228166 A1 * | 11/2004 | Braun | G06F 13/1673 711/E12.004 |
| 2006/0179213 A1 * | 8/2006 | Brittain | G06F 13/161 711/105 |
| 2012/0159037 A1 * | 6/2012 | Kwon | G06F 13/4022 710/317 |
| 2012/0167100 A1 | 6/2012 | Li et al. | |
| 2012/0239852 A1 * | 9/2012 | Calvert | G06F 11/1441 711/170 |
| 2015/0309751 A1 * | 10/2015 | Ellis | G06F 3/0625 711/154 |
| 2016/0328152 A1 * | 11/2016 | Nemazie | G11C 11/1673 |

(Continued)

*Primary Examiner* — Gautam Sain
*Assistant Examiner* — Edward Waddy, Jr.
(74) *Attorney, Agent, or Firm* — IP & T GROUP LLP

(57) ABSTRACT

A memory system includes a plurality of memory devices configuring a plurality of ways, and a memory controller communicating with the plurality of memory devices through a channel, wherein each of the plurality of memory devices includes a device queue, and wherein the device queue queues a plurality of controller commands inputted from the memory controller.

27 Claims, 27 Drawing Sheets

(56) References Cited

U.S. PATENT DOCUMENTS

| | | | |
|---|---|---|---|
| 2016/0371034 A1* | 12/2016 | Kang | G06F 13/28 |
| 2017/0068451 A1* | 3/2017 | Kenan | G06F 3/0659 |
| 2018/0067694 A1* | 3/2018 | Berman | G06F 3/0611 |
| 2018/0321987 A1* | 11/2018 | Benisty | G06F 3/0659 |
| 2021/0303206 A1* | 9/2021 | Saxena | G06F 3/0604 |

* cited by examiner

FIG. 7

| COMMAND QUEUE STRUCTURE |
|---|
| COMMAND TYPE (READ/PROGRAM/ERASE) |
| PHYSICAL ADDRESS MAPPING INFORMATION (WAY/PAGE/MEMORY BLOCK/COLUMN) |
| COMMAND QUEUE SLOT NUMBER |
| DEVICE QUEUE (QUEUE, ABORTION) |

| REPORT QUEUE STRUCTURE |
|---|
| EXCEPTIONAL CASE (ERROR CORRECTION FAILURE, OPERATION FAILURE) |
| PHYSICAL ADDRESS MAPPING INFORMATION (WAY/PAGE/MEMORY BLOCK/COLUMN) |
| COMMAND QUEUE SLOT NUMBER |
| DEVICE QUEUE (QUEUE, ABORTION, FULLY-BOUNDED) |

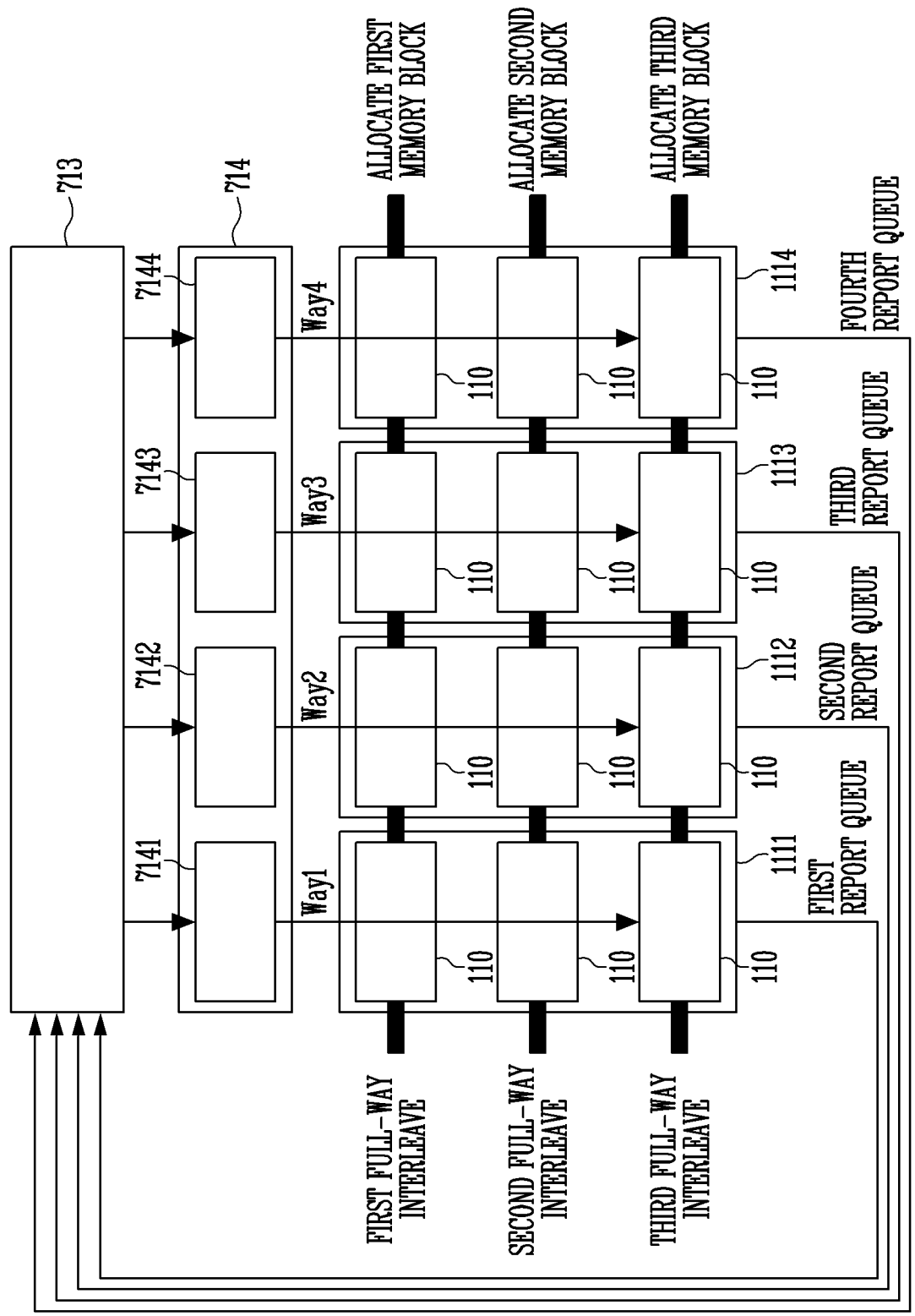

FIG. 17

| | SR<8> | SR<7> | SR<6> | SR<5> | SR<4> | SR<3> | SR<2> | SR<1> |
|---|---|---|---|---|---|---|---|---|
| Definition of Value | * | External Busy : "0" Ready : "1" | Internal Busy : "0" Ready : "1" | Pass : "0" Suspend : "1" | Abort Flag | Queue Flag | Fully Queue Bounded | Pass : "0" Fail : "1" |
| 7Th | * | Ready | Ready | Erase/PGM Suspend status | Abort Flag | Queue Flag | Queue Bounded | FAIL |

MEMORY DEVICE QUEUING A PLURALITY OF COMMANDS AND MEMORY SYSTEM HAVING MEMORY DEVICE

CROSS-REFERENCE TO RELATED APPLICATION

This application is a continuation-in-part of application that claims priority onto U.S. patent application Ser. No. 15/961,031 filed on Apr. 24, 2018, that issued as U.S. Pat. No. 11,099,776 on Aug. 24, 2021, and which claims the benefits of priority of Korean Patent Application No. 10-2017-0121096 filed on Sep. 20, 2017. The disclosure of each of the foregoing applications is incorporated herein by reference in their entirety.

BACKGROUND

Field of Invention

Various embodiments of the invention relate to a memory system and an operating method thereof, and more particularly, to a memory system including a memory device queuing a plurality of commands, and an operating method thereof.

Description of Related Art

Memory devices may be classified into volatile memory devices and non-volatile memory devices. Data of a volatile memory device may not be maintained in the absence of power. However, data of a non-volatile memory will remain even when power supply is blocked. Examples of non-volatile memory devices may include a read only memory (ROM) and an Electrically Erasable Programmable Read-Only Memory (EEPROM).

The configuration and operation of a flash memory device introduced as a flash EEPROM are different from those of the conventional EEPROM. The flash EEPROM memory device may perform an electric erase operation in units of blocks and perform a program operation in units of bits.

SUMMARY

Various embodiments of the present invention are directed to a memory system and a method of operating the memory system. The memory system exhibits improved random read or program performance.

In accordance with an embodiment, a memory system may include a plurality of memory devices configuring a plurality of ways, and a memory controller communicating with the plurality of memory devices through a channel, wherein each of the plurality of memory devices includes a device queue, and wherein the device queue queues a plurality of controller commands inputted from the memory controller.

In accordance with an embodiment, a memory system may include first to Nth way command queues corresponding to first to Nth ways, respectively, where N is a natural number of 2 or more, and first to Nth memory devices corresponding to the first to Nth ways, wherein each of the first to Nth way command queues queue M commands, where M is a natural number of 2 or more, wherein each of the first to Nth memory devices includes a device queue, and wherein the device queue comprises: a device command queue for queuing L commands which are sequentially inputted, where L is a natural number of 2 or more, and a queue command execution control circuit for controlling executions of the L commands queued to the device command queue, wherein the queue command execution control circuit controls the device command queue so that the L commands are executed in parallel.

In accordance with an embodiment, a memory device may include a device command queue for queuing a plurality of commands inputted sequentially, and a queue command execution control circuit controlling executions of the plurality of commands queued to the device command queue.

In accordance with an embodiment, a method of operating a memory system may include performing a first queuing operation to queue a plurality of commands which are sequentially inputted from a host to a first way command queue, among a plurality of command queues; sequentially transferring the plurality of commands to a first memory device corresponding to the first way command queue, among a plurality of memory devices corresponding to the plurality of way command queues; performing a second queuing operation to cause the first memory device to queue the plurality of commands sequentially transferred, and executing, by the first memory device, the plurality of commands in parallel.

In accordance with an embodiment, a memory system comprising: a plurality of memory devices each having a device queue; and a controller having a plurality of command queues respectively corresponding to the memory devices, wherein the controller is suitable for: queueing commands into the command queues for the respective memory devices according to a predetermined order; providing the commands from the command queues to respectively corresponding ones among the device queues; and controlling the respective memory devices to independently perform operations in parallel according to the commands queued in respectively corresponding device queues.

These and other features and advantages of the present invention will become apparent to those skilled in the art to which the present invention pertains from the following detailed description in reference to the accompanying drawings.

BRIEF DESCRIPTION OF THE DRAWINGS

FIG. 7 is a diagram illustrating a command execution process in accordance with embodiment.

FIG. 8 is a diagram illustrating a command queue structure and a report queue structure in accordance with an embodiment.

FIG. 17 is a timing diagram illustrating a command queue interface of a memory device in accordance with an embodiment.

DETAILED DESCRIPTION

Figure 1:
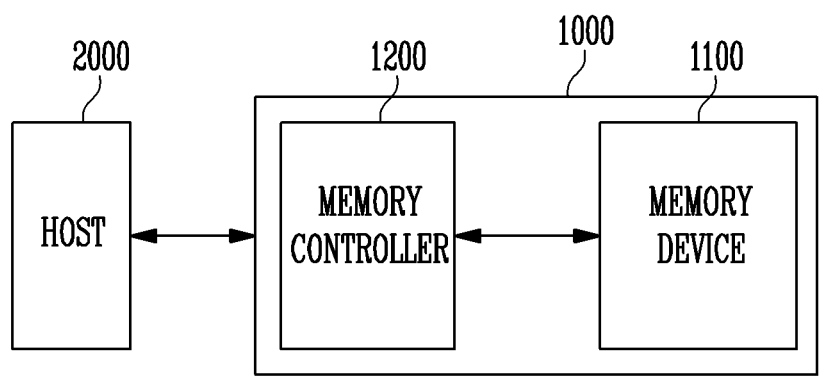
FIG. 1 is a diagram illustrating a memory system in accordance with an embodiment.

Hereinafter, various exemplary embodiments will be described in detail with reference to the accompanying drawings. We note, however, that the present invention may be embodied in different other embodiments, forms and variations thereof and should not be construed as being limited to the embodiments set forth herein. Rather, the described embodiments are provided so that this disclosure will be thorough and complete, and will fully convey the present invention to those skilled in the art to which this invention pertains.

In the drawings, thicknesses and lengths of components may be exaggerated for convenience of illustration. In the following description, a detailed description of related functions and constitutions may be omitted for simplicity and conciseness. Like reference numerals refer to like elements throughout the specification and drawings.

It is also noted that in this specification, "connected/coupled" refers to one component not only directly coupling another component but also indirectly coupling another component through an intermediate component. In addition, throughout the specification, when it is said that a certain part "includes" a certain element, this does not exclude other elements from being included but the certain part may further include another element unless particularly described otherwise.

It will be understood that, although the terms "first", "second", "third", and so on may be used herein to describe various elements, these elements are not limited by these terms. These terms are used to distinguish one element from another element. Thus, a first element described below could also be termed as a second or third element without departing from the spirit and scope of the present invention.

In addition, it will also be understood that when an element is referred to as being "between" two elements, it may be the only element between the two elements, or one or more intervening elements may also be present.

The terminology used herein is for the purpose of describing particular embodiments only and is not intended to be limiting of the present invention. As used herein, singular forms are intended to include the plural forms as well, unless the context clearly indicates otherwise. As used herein, the term "and/or" includes any and all combinations of one or more of the associated listed items.

Unless otherwise defined, all terms including technical and scientific terms used herein have the same meaning as commonly understood by one of ordinary skill in the art to which the present invention belongs in view of the present disclosure. It will be further understood that terms, such as those defined in commonly used dictionaries, should be interpreted as having a meaning that is consistent with their meaning in the context of the present disclosure and the relevant art and will not be interpreted in an idealized or overly formal sense unless expressly so defined herein.

In the following description, numerous specific details are set forth in order to provide a thorough understanding of the present invention. The present invention may be practiced without some or all of these specific details. In other instances, well-known process structures and/or processes have not been described in detail in order not to unnecessarily obscure the present invention.

It is also noted, that in some instances, as would be apparent to those skilled in the relevant art, a feature or element described in connection with one embodiment may be used singly or in combination with other features or elements of an embodiment, unless otherwise specifically indicated.

FIG. 1 is a diagram illustrating a memory system 1000 in accordance with an embodiment.

Referring to FIG. 1, the memory system 1000 may include a memory device 1100 for storing data and a memory controller 1200 operatively coupled to the memory device 1100 for controlling the memory device 1100. The controller 1200 may be further operatively coupled to a host 2000. The controller 1200 may control an operation of the memory device 1100 under the control of the host 2000. For example, the controller 1200 may control an operation of the memory device 1100 in response to a control command received from the host 2000.

The host 2000 may communicate with the memory system 1000 by using any suitable interface protocol such as, for example, a Peripheral Component Interconnect-Express (PCI-E), an Advanced Technology Attachment (ATA), a Serial ATA (SATA), a Parallel ATA (PATA), or a serial attached SCSI (SAS), a Universal Serial Bus (USB), a Multi-Media Card (MMC), an Enhanced Small Disk Interface (ESDI), or an Integrated Drive Electronics (IDE) and the like.

The memory controller 1200 may control the general operations of the memory system 1000 including data exchange between the host 2000 and the memory device 1100. For example, the memory controller 1200 may control the memory device 1100 to program or read data in response to a request from the host 2000. In addition, the memory controller 1200 may store information about main memory blocks and sub-memory blocks included in the memory device 1100, and may select the memory device 1100 to perform a program operation on a main memory block or a sub-memory block according to the amount of data loaded for the program operation. In accordance with an embodiment, the memory device 1100 may be or include a Double Data Rate Synchronous Dynamic Random Access Memory (DDR SDRAM), a Low Power Double Data Rate4 (LPDDR4) SDRAM, a Graphics Double Data Rate (GDDR) SDRAM, a Low Power DDR (LPDDR), a Rambus Dynamic Random Access Memory (RDRAM), a FLASH Memory and the like.

The memory controller 1200 may control the memory device 1100 to perform a program, read, or erase operation.

Figure 2:
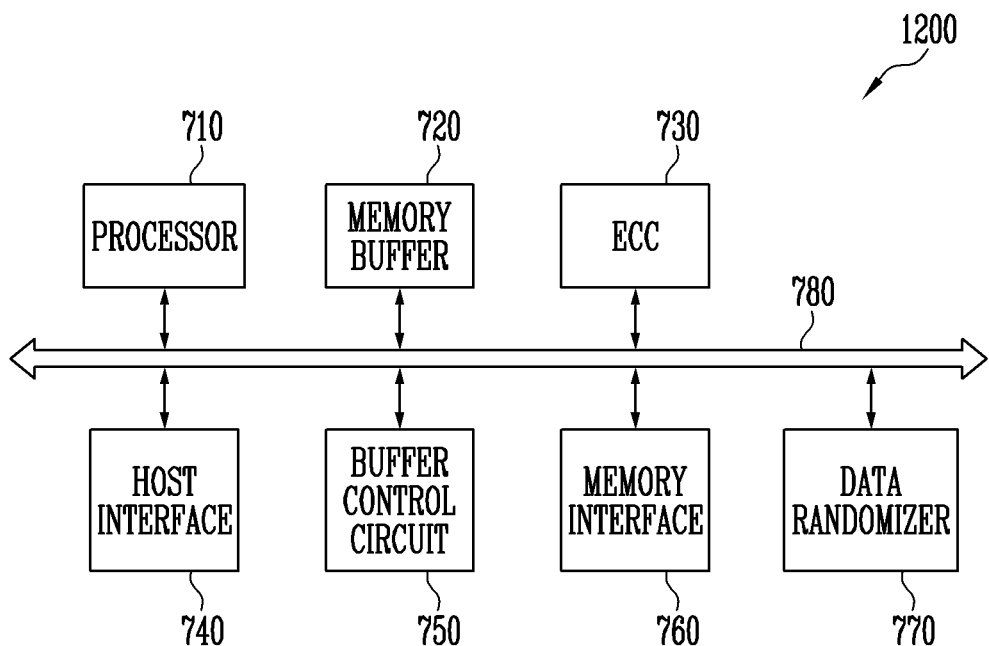
FIG. 2 is a diagram illustrating an exemplary configuration of a memory controller shown in FIG. 1.

FIG. 2 is a diagram illustrating an exemplary configuration of the memory controller 1200 shown in FIG. 1.

Referring to FIG. 2, the memory controller 1200 may include a processor 710, a memory buffer 720, an error correction circuit (ECC) 730, a host interface 740, a buffer control circuit 750, a memory interface 760, a data randomizer 770, operatively coupled via a bus 780.

The bus 780 may provide one more channels operatively coupling the various components of the memory controller 1200.

The processor 710 may control the overall operation of the memory controller 1200 and may perform a logical operation. The processor 710 may communicate with an external host 2000 through the host interface 740 and with the memory device 1100 through the memory interface 760. Further, the processor 710 may communicate with the memory buffer 720 through the buffer control circuit 750. The processor 710 may control the operations of the memory system 1000 by using the memory buffer 720 as an operation memory, a cache memory or a buffer memory.

The processor 710 may queue a plurality of commands inputted from the host 2000. A command which is inputted from the host 2000 may be referred to as a host command. The queuing operation may be a multi-queuing operation. The processor 710 may sequentially transfer a plurality of queued commands also referred to as queued tags to the memory device 1100. In addition, the processor 710 may change the order of the queued tags and transfer the re-ordered queued tags to the memory device 1100. The processor 710 may use various methods such as priority weight assignment or cross reference in order to efficiently process the queued tags.

The memory buffer 720 may be used as an operation memory, a cache memory, or a buffer memory of the processor 710. The memory buffer 720 may store codes and commands executed by the processor 710. The memory buffer 720 may store data that is processed by the processor 710. The memory buffer 720 may be or include a static RAM (SRAM) or a dynamic RAM (DRAM).

The ECC 730 may perform error correction. The ECC 730 may perform error correction code encoding based on data to be written to the memory device 1100 through the memory interface 760. The encoded data may be transferred to the memory device 1100 through the memory interface 760. The ECC 730 may perform error correction code decoding based on data received from the memory device 1100 through the memory interface 760. In an example, the ECC 730 may be included in the memory interface 760 as one of the components of the memory interface 760.

The host interface 740 may be configured to communicate with the external host 2000 in response to control of the processor 710. The host interface 740 may perform communication using at least one of various communication methods such as a Universal Serial Bus (USB), a Serial AT Attachment (SATA), a Serial Attached SCSI (SAS), a High Speed Interchip (HSIC), a Small Computer System Interface (SCSI), a Peripheral Component Interconnection (PCI), a PCI express (PCIe), a Nonvolatile Memory express (NVMe), a Universal Flash Storage (UFS), a Secure Digital (SD), a MultiMedia Card (MMC), an embedded MMC (eMMC), a Dual In-line Memory Module (DIMM), a Registered DIMM (RDIMM), Load Reduced DIMM (LRDIMM) communication methods and the like.

The buffer control circuit 750 may control the memory buffer 720 under the control of the processor 710.

The memory interface 760 may communicate with the memory device 1100 under the control of the processor 710. The memory interface 760 may transmit/receive commands, addresses, and data to/from the memory device 1100 through one or more channels.

In an embodiment, the memory controller 1200 may not include the memory buffer 720 and the buffer control circuit 750. Hence, the memory buffer 720 and the buffer control circuit 750 are optional.

In operation, in accordance with an embodiment, the processor 710 may control the operations of the memory controller 1200 using one or more codes. The processor 710 may load the one or more codes from a nonvolatile memory device (e.g., a ROM) provided in the memory controller 1200. In an embodiment, the processor 1010 may load the one or more codes from the memory device 1100 through the memory interface 760.

The data randomizer 770 may randomize data and/or de-randomize the randomized data. The data randomizer 770 may perform data randomization on data to be written to the memory device 1100 through the memory interface 760. The randomized data may be transferred to the memory device 1100 through the memory interface 760. The data randomizer 770 may perform de-randomization on the data received from the memory device 1100 through the memory interface 760. In an embodiment, the data randomizer 770 may be included in the memory interface 760 as one of the components of the memory interface 760.

In an embodiment, the bus 780 of the memory controller 1200 may include a control bus and a data bus. The data bus may be configured to transfer data in the memory controller 1200, and the control bus may be configured to transfer control information such as commands or addresses in the memory controller 1200. The data bus and the control bus may be isolated from each other, and may neither interfere with each other nor influence each other. The data bus may be coupled to the host interface 740, the buffer control circuit 750, the ECC 730, and the memory interface 760. The control bus may be coupled to the host interface 740, the processor 710, the buffer control circuit 750, the memory buffer 720, and the memory interface 760.

Figure 3:
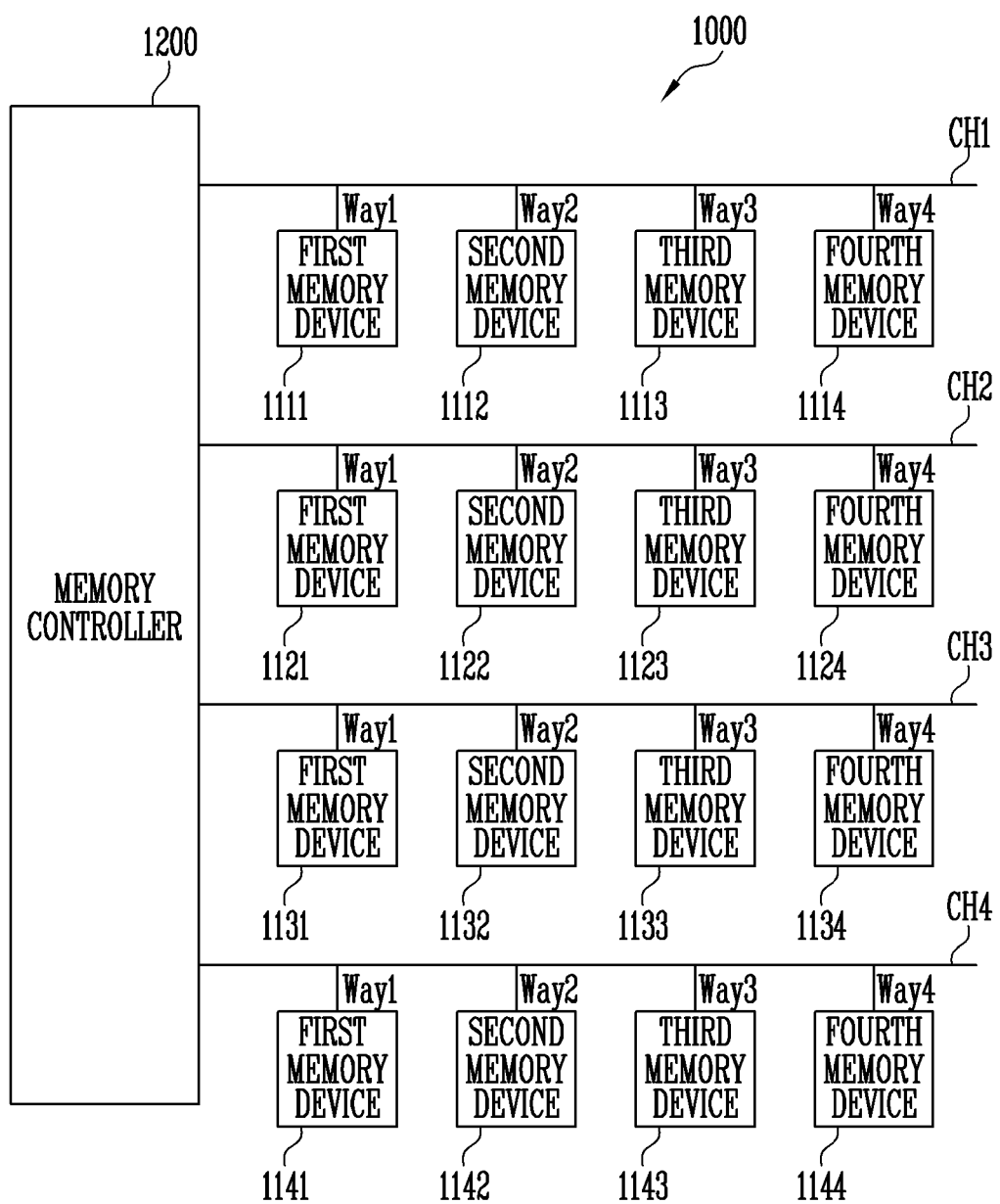
FIG. 3 is a diagram illustrating a memory system in accordance with an embodiment.

FIG. 3 is a diagram illustrating the memory system 1000 in accordance with an embodiment of the invention. FIG. 3 illustrates the memory system 1000 that includes the memory controller 1200 and a plurality of memory devices 1111 to 1114 coupled to the memory controller 1200 through a plurality of channels CH1 to CH4.

Referring to FIG. 3, the memory controller 1200 may include first, second, third and fourth channels CH1, CH2, CH3, and CH4. The memory controller 1200 may communicate data or commands with a first memory device 1111 corresponding to a first way Way1, a second memory device 1112 corresponding to a second way Way2, a third memory device 1113 corresponding to a third way Way3, and a fourth memory device 1114 corresponding to a fourth way Way4 through the first channel CH1. Each of the first to fourth memory devices 1111 to 1114 coupled to the first channel CH1 may have the same configuration as the memory device 1100 shown in FIG. 1. In addition, the memory controller 1200 may communicate data or commands with a first memory device 1121 corresponding to a first way Way1, a second memory device 1122 corresponding to a second way Way2, a third memory device 1123 corresponding to a third way Way3, and a fourth memory device 1124 corresponding to a fourth way Way4 through the second channel CH2. Each of the first to fourth memory devices 1121 to 1124 coupled to the second channel CH2 may have the same configuration as the memory device 1100 shown in FIG. 1.

In addition, the memory controller 1200 may communicate data or commands with a first memory device 1131 corresponding to a first way Way1, a second memory device 1132 corresponding to a second way Way2, a third memory device 1133 corresponding to a third way Way3, and a fourth memory device 1134 corresponding to a fourth way Way4 through the third channel CH3. Each of the first to fourth memory devices 1131 to 1134 coupled to the third channel CH3 may have the same configuration as the memory device 1100 shown in FIG. 1. In addition, the memory controller 1200 may exchange data or commands with a first memory device 1141 corresponding to a first way Way1, a second memory device 1142 corresponding to a second way Way2, a third memory device 1143 corresponding to a third way Way3, and a fourth memory device 1144 corresponding to a fourth way Way4 through the fourth channel CH4. Each of the first to fourth memory devices 1141 to 1144 coupled to the fourth channel CH4 may have the same configuration as the memory device 1100 shown in FIG. 1. However, we note that the number of channels and the number of ways of the memory system 1000 may not be limited to four. The memory system 1000 may include fewer or more channels and fewer or more ways.

Since the first to fourth memory devices 1111 to 1114 coupled to the first channel CH1 share the first channel CH1, these memory devices may exchange data or commands with the memory controller 1200, not simultaneously, i.e., in parallel, but in a sequential manner. For example, while the memory controller 1200 is transmitting data to the first memory device 1111 configuring the first way Way1 of the first channel CH1 through the first channel CH, the second to fourth memory devices 1112 to 1114 configuring the second to fourth ways Way2 to Way4 of the first channel CH1, respectively, may be unable to exchange data or commands with the memory controller 1200 through the first channel CH1. That is, while one of the first to fourth memory devices 1111 to 1114 sharing the first channel CH1 occupies the first channel CH1, the other memory devices coupled to the first channel CH1 may not occupy the first channel CH1.

All the memory devices 1111 to 1114, 1121 to 1124, 1131 to 1141, or 1141 to 1144 configuring the plurality of ways Way1 to Way4 coupled to one of the channels CH1 to CH4, respectively, may be controlled to perform internal operations, for example, read, program or erase operations at the same time in parallel, which may be referred to as a full-way interleaving. For example, when the first, second, third, and fourth memory devices 1111, 1112, 1113, and 1114 forming the first, second, third, and fourth ways way1, way2, way3, and way4, respectively, which are coupled to the first channel CH1 perform read, program, or erase operations in parallel, this is called full-way interleave. The performance of the memory system 1000 may be maximized when the memory controller 1200 controls the memory devices 1111 to 1144 to be full-way interleaved. For example, the memory controller 1200 may determine an execution order of the queued commands so that the memory devices 1111 to 1144 may be full-way interleaved. This will be described below in more detail.

The first memory device 1111 configuring the first way Way1 of the first channel CH1 and the first memory device 1121 configuring the first way Way1 of the second channel CH2 may communicate with the memory controller 1200, independently of each other. For example, the memory controller 1200 may exchange data with the first memory device 1121 configuring the first way Way1 of the second channel CH2 through the second channel CH2 at the same time as the first memory device 1200 exchanges data with the first memory device 1111 configuring the first way Way1 of the first channel CH1 through the first channel CH1. For example, memory devices 1111 to 1144 coupled to different channels CH1 to CH4 may exchange data with the memory controller 1200 in parallel with each other, i.e., independently of each other.

Figure 4:
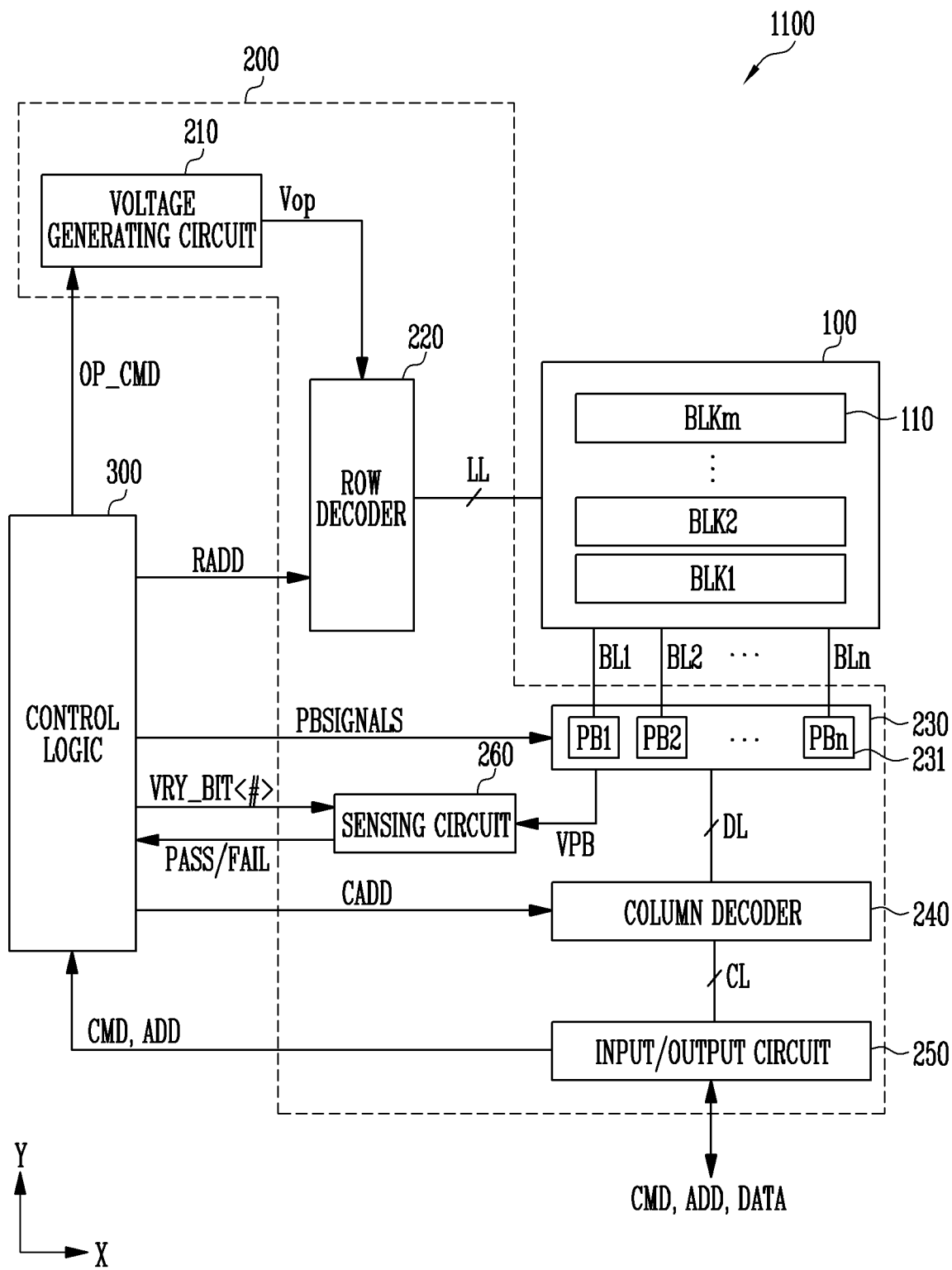
FIG. 4 is a diagram illustrating an exemplary configuration of a memory device shown in FIG. 1.

FIG. 4 is a diagram illustrating an exemplary configuration of the memory device 1100 shown in FIG. 1.

Referring to FIG. 4, the memory device 1100 may include a memory cell array 100 for storing data therein. The memory device 1100 may include peripheral circuits 200 configured to perform a program operation to store data in the memory cell array 100, a read operation to output the stored data, and an erase operation to output the stored data. The memory device 1100 may include a control logic 300 for controlling the peripheral circuits 200 in response to control of the memory controller 1200 shown in FIG. 1.

The memory cell array 100 may include a plurality of memory blocks (MB1 to MBk) 110, where k is a positive integer. Local lines LL and bit lines BL1 to BLn may be coupled to the memory blocks (MB1 to MBk) 110, where n is a positive integer. For example, the local lines LL may include a first select line, a second select line, and a plurality of word lines arranged between the first and second select lines. In addition, the local lines LL may include dummy lines arranged between the first select line and the word lines and between the second select line and the word lines. The first select line may be a source select line, and the second select line may be a drain select line. For example, the local lines LL may include word lines, drain and source select lines, and source lines. For example, the local lines LL may further include dummy lines. For example, the local lines LL may further include pipe lines. The local lines LL may be coupled to the memory blocks (MB1 to MBk) 110, respectively, and the bit lines BL1 to BLn may be commonly coupled to the memory blocks (MB1 to MBk) 110. The memory blocks (MB1 to MBk) 110 may have a two-dimensional or three-dimensional structure. For example, in a two-dimensional memory block 110, memory cells may be arranged in parallel with a substrate while in a three-dimensional memory block 110, memory cells may be arranged in a vertical direction to the substrate.

The peripheral circuits 200 may be configured to perform program, read and erase operations on the selected memory block 110 in response to control of the control logic 300. For example, the control logic 300 may control the peripheral circuits 200 to supply a verify voltage and pass voltages to the first select line, the second select line, and the word lines, selectively discharge the first select line, the second select line and the word lines, and verify memory cells coupled to a selected word line, among the word lines. For example, the peripheral circuits 200 may include a voltage generating circuit 210, a row decoder 220, a page buffer group 230, a column decoder 240, an input/output circuit 250, and a sensing circuit 260.

The voltage generating circuit 210 may generate various operating voltages Vop applied to perform program, read and erase operations in response to an operation signal OP_CMD. In addition, the voltage generating circuit 210 may selectively discharge the local lines LL in response to the operation signal OP_CMD. For example, the control logic 300 may control the voltage generating circuit 210 to generate a program voltage, a verify voltage, pass voltages, a turn on voltage, a read voltage, an erase voltage, and a source line voltage.

The row decoder 220 may transfer the operating voltages Vop to the local lines LL coupled to the selected memory block 110 in response to a row address RADD.

The page buffer group 230 may include a plurality of page buffers (PB1 to PBn) 231 coupled to the bit lines BL1 to BLn. The page buffers (PB1 to PBn) 231 may operate in response to page buffer control signals PBSIGNALS. For example, the page buffers (PB1 to PBn) 231 may temporarily store data received through the bit lines BL1 to BLn, or sense voltages or currents in the bit lines BL1 to BLn during a read or verify operation.

The column decoder 240 may transfer data between the input/output circuit 250 and the page buffer group 230 in response to a column address CADD. For example, the column decoder 240 may exchange data with the page buffers 231 through data lines DL, or may exchange data with the input/output circuit 250 through column lines CL.

The input/output circuit 250 may transfer the command CMD and the address ADD from the memory controller 1200 shown in FIG. 1 to the control logic 300, or exchange data DATA with the column decoder 240. A command which is input from the memory controller 1200 may be referred to as a controller command.

During a read operation or a verify operation, the sensing circuit 260 may generate a reference current in response to an allowable bit VRY_BIT<#> and to output a pass signal PASS or a fail signal FAIL by comparing a sensing voltage VPB received from the page buffer group 230 with a reference voltage generated by the reference current.

The control logic 300 may control the peripheral circuits 200 by outputting the operation signal OP_CMD, the row address RADD, the page buffer control signals PBSIGNALS and the allowable bit VRY_BIT<#> in response to the command CMD and the address ADD. In addition, the control logic 300 may determine whether a verify operation passes or fails in response to the pass or fail signal PASS or FAIL.

Figure 5:
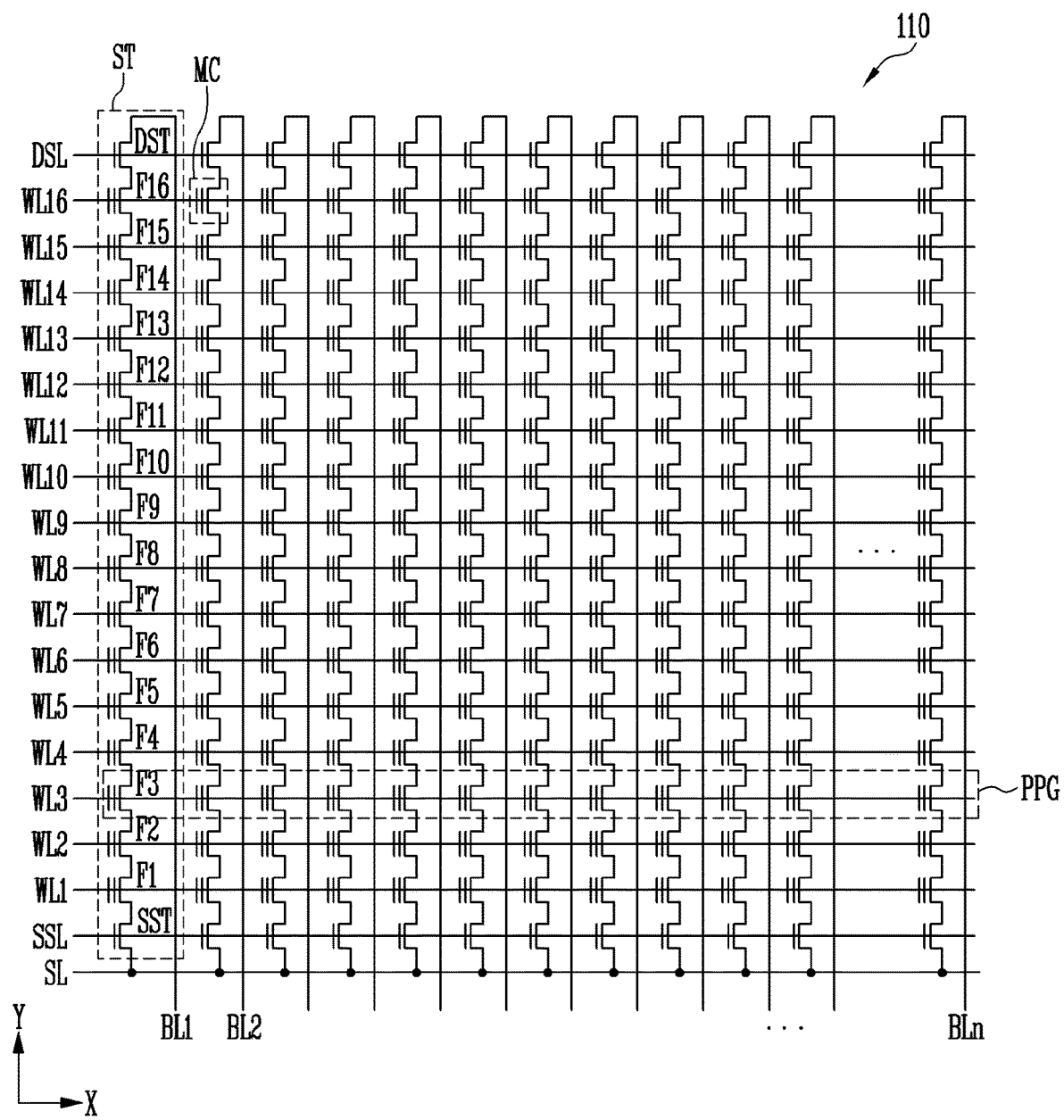
FIG. 5 is a diagram illustrating an exemplary configuration of a memory block shown in FIG. 4.

FIG. 5 is a diagram illustrating one of the memory blocks 110 shown in FIG. 4.

Referring to FIG. 5, the memory block 110 may be configured such that a plurality of word lines, which are arranged in parallel, may be coupled between a first select line and a second select line. The first select line may be a source select line SSL and the second select line may be a drain select line DSL. More specifically, the memory block 110 may include a plurality of strings ST coupled between the bit lines BL1 to BLn and a source line SL. Each of the bit lines BL1 to BLn may be coupled to each of the strings ST, and the source line SL may be commonly coupled to the strings ST. Since the strings ST may have similar configurations to each other, the string ST coupled to the first bit line BL1 will be described in detail as an example.

The string ST may include a source select transistor SST, a plurality of memory cells F1 to F16, and a drain select transistor DST coupled in series between the source line SL and the first bit line BL1. A single string ST may include at least one source select transistors SST and at least one drain select transistors DST, and may include more memory cells than the memory cells F1 to F16 as shown in FIG. 5.

A source of the source select transistor SST may be coupled to the source line SL, and a drain of the drain select transistor DST may be coupled to the first bit line BL1. The memory cells F1 to F16 may be coupled in series between the source select transistor SST and the drain select transistor DST. Gates of the source select transistors SST included in different strings ST may be coupled to the source select line SSL, gates of the drain select transistors DST may be coupled to the drain select line DSL, and gates of the memory cells F1 to F16 may be coupled to a plurality of word lines WL1 to WL16. A group of memory cells coupled to the same word line, among memory cells included in different strings ST, may be referred to as a physical page PPG. Therefore, the memory block 110 may include as many physical pages PPG as the number of word lines WL1 to WL16.

One memory cell MC may store 1-bit data. This memory cell is generally called a single level cell (SLC). In this example, a single physical page PPG may store data corresponding to a single logical page LPG. Data of the single logical page LPG may include as many data bits as the number of cells included in the single physical page PPG. In addition, one memory cell MC may store two or more bits of data. This cell is typically referred to as a "multi-level cell (MLC)". In this example, the single physical page PPG may store data corresponding to two or more logical pages LPG.

Figure 6:
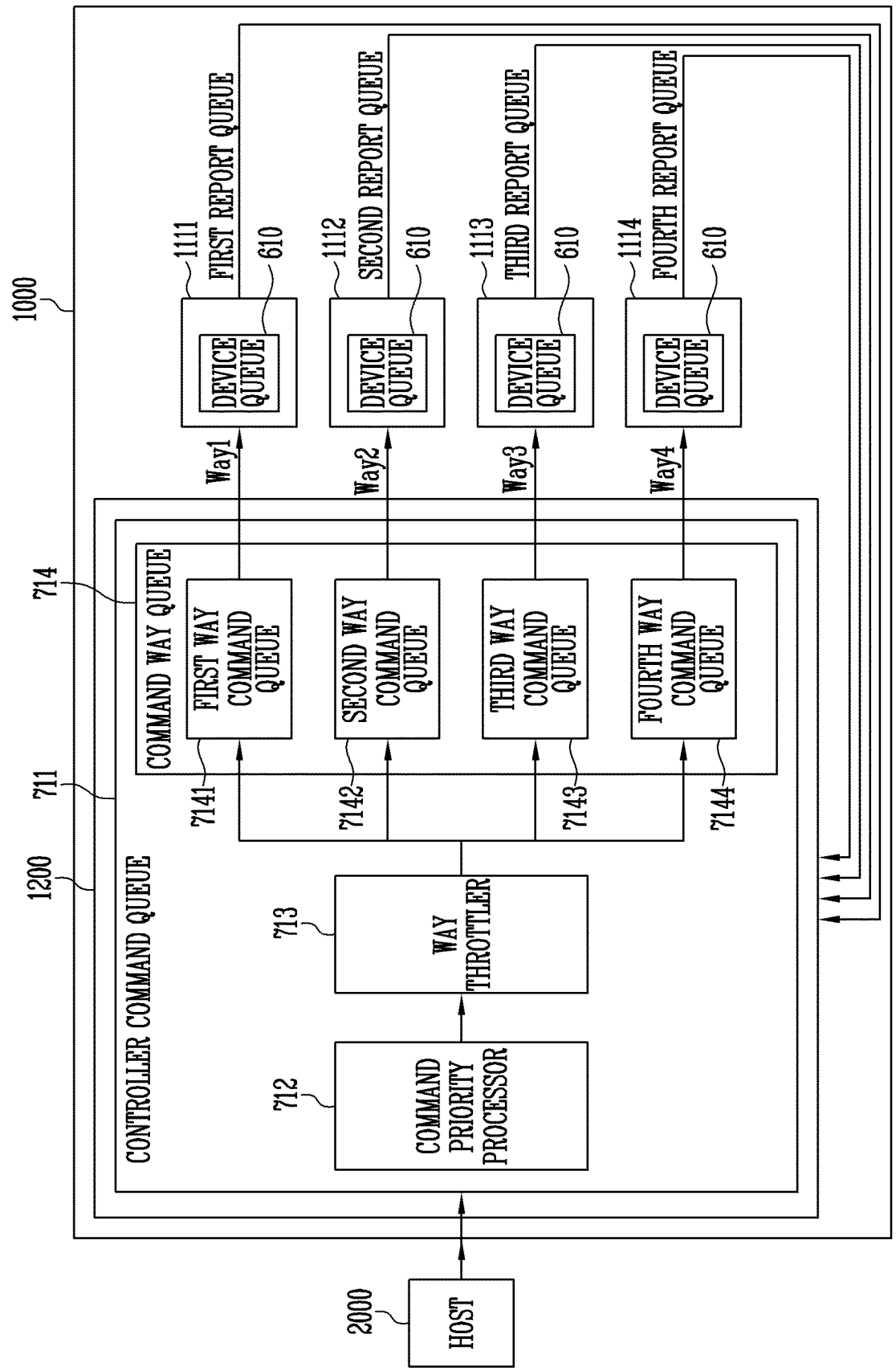
FIG. 6 is a diagram illustrating a command execution process in accordance with an embodiment.

FIG. 6 is a diagram illustrating a command execution process in accordance with an embodiment.

Referring to FIG. 6, the memory controller 1200 of the memory system 1000 may queue commands inputted from the host 2000 to a controller command queue 711. The commands inputted from the host 2000 may be referred to as host commands. In addition, the memory controller 1200 of the memory system 1000 may also queue a plurality of internal commands related to an internal operation such as a house-keeping operation of the memory system 1000 into the controller command queue 711.

An execution order of the plurality of commands queued to the controller command queue 711 may be determined depending on priority weights assigned to the queued commands by a command priority processor 712. For example, the command priority processor 712 may assign a priority weight to each of the plurality of commands inputted from the host 2000 and to each of the internal commands for determining the execution order of these commands.

For example, the command priority processor 712 may assign one of an admin priority, an urgent priority, and a normal priority to each of the plurality of commands. In addition, the normal priority may be classified into high priority, medium priority, and low priority. The command priority processor 712 may assign one of the priorities e.g., the admin priority, the urgent priority, the high priority, the medium priority, and the low priority to each of the plurality of commands.

The execution order of the plurality of commands may be determined depending on their assigned priority weights. For example, the command priority processor 712 may assign a higher priority weight to a read command, among the plurality of commands, than to a program command, and vice versa.

A way throttler 713 may apply the plurality of commands inputted from the host 2000 or the internal commands to one of the memory devices 1111 to 1114 corresponding to the plurality of ways Way1 to Way4. The way throttler 713 may allocate each of the plurality of commands to one of the first to fourth ways Way1 to Way4 so that a full-way interleave described above with reference to FIG. 3 may be performed.

For example, when the way throttler 713 sequentially receives a first command for reading first data from the first memory device 1111, a second command for reading second data from the second memory device 1112, a third command for reading third data from the third memory device 1113, a fourth command for reading fourth data from the fourth memory device 1114, and subsequently receiving a fifth command for reading fifth data from the third memory device 1113 and a sixth command for reading sixth data from the fourth memory device 1114, the way throttler 713 may change the execution order of the first to sixth commands in a different manner to the input order thereof so that the first and second commands and the fifth and sixth commands may be executed in parallel and the memory devices 1111 to 1114 corresponding to the plurality of Way1 to Way4 may be full-way interleaved.

When the way throttler 713 allocates the plurality of commands inputted from the host 2000 to first to fourth way command queues 7141 to 7144 of a command way queue 714, the first to fourth way command queues 7141 to 7144 of the command way queue 714 may be fully bounded. When the first to fourth way command queues 7141 to 7144 of the command way queue 714 are fully bounded, this means that the first to fourth way command queues 7141 to 7144 may queue all queueable commands.

For example, each of the first to fourth way command queues 7141 to 7144 may include N controller command queues, where N is a natural number. For example, each of the first to fourth way command queues 7141 to 7144 may include N controller command queue slots each slot capable of receiving one command. For example, when each of the first to fourth way command queues 7141 to 7144 includes N controller command queues, this means that each of the first to fourth way command queues 7141 to 7144 may queue up to N commands. Hence, the larger the number N is the more commands can be queued in each of the first to fourth way command queues 7141 to 7144.

In operation, the controller command queue 711 may assign one of the plurality of priority weights to each of the plurality of commands inputted from the host 2000, and may queue these commands to one of the first to fourth way command queues 7141 to 7144 so that the first to fourth way command queues 7141 to 7144 may be fully bounded in consideration of full-way interleaving. Commands queued to the first way command queue 7141 may be applied to the first memory device 1111 configuring the first way Way1, commands queued to the second way command queue 7142 may be applied to the second memory device 1112 configuring the second way Way2, commands queued to the third way command queue 7143 may be applied to the third memory device 1113 configuring the third way Way3, and commands queued to the fourth way command queue 7144 may be applied to the fourth memory device 1114 configuring the fourth way Way4.

Each of the first to fourth memory devices 1111 to 1114 may include a device queue 610. The device queue 610 may include M command queues, where M is a natural number. For example, the device queue 610 of each of the first to fourth memory devices 1111 to 1114 may include M device command queue slots. When the device queue 610 of each of the first to fourth memory devices 1111 to 1114 includes M device command queue slots, this means that each of the first to fourth memory devices 1111 to 1114 may queue M commands. For example, the larger the number M is, the more commands can be queued in each of the device queues 610 of the first to fourth memory devices 1111 to 1114.

The first to fourth memory devices 1111 to 1114 may transfer first to fourth report queues with respect to the executed commands to the controller command queue 711. More specifically, the memory controller 1200 may apply a get feature command to each of the first to fourth memory devices 1111 to 1114, and each of the first to fourth memory devices 1111 to 1114 may in response feedback information about the execution status of the commands received from the memory controller 1200, i.e., feedback a report queue to the controller command queue 711 in response to the get feature command. The first to fourth way command queues 7141 to 7144 of the controller command queue 711 may change a command queuing status in response to the first to fourth report queues. This will be described below in more detail. The first to fourth report queues may be transmitted from the respective device queue 610 of each memory device 1111 to 1114.

When the plurality of commands are received from the host 2000, the command priority processor 712 and the way throttler 713 may determine priority weights to be assigned to each of the plurality of commands and ways to be allocated thereto. As described above, each of the first to fourth way command queues 7141 to 7144 may include N controller command queues, where N is a natural number. For example, each of the first to fourth way command queues 7141 to 7144 may include N controller command queue slots. For example, when each of the first to fourth way command queues 7141 to 7144 includes N controller command queues, it means that each of the first to fourth way command queues 7141 to 7144 queues N commands.

In addition, the device queue 610 may include M command queues, where M is a natural number. For example, the device queue 610 of each of the first to fourth memory devices 1111 to 1114 may include M device command queue slots. When the device queue 610 of each of the first to fourth memory devices 1111 to 1114 includes the M device command queue slots, this means that each of the first to fourth memory devices 1111 to 1114 may queue M commands.

As a result, each way may substantially queue (N+M) commands.

The commands queued to the first to fourth way command queues 7141 to 7144 may be applied to the respective device queues 610 of the first to fourth memory devices 1111 to 1114, respectively. In addition, the commands applied to the device queue 610 of each of the first to fourth memory devices 1111 to 1114 may be in-place updated by a set feature command.

In addition, the first to fourth memory devices 1111 to 1114 may transfer the first to fourth report queues in response to a get feature command, and the memory controller 1200 may erase commands which are completely executed from the first to fourth way command queues 7141 to 7144 on the basis of the first to fourth report queues.

In addition, commands which are completely executed, among the commands queued to the device queue 610 of each of the first to fourth memory devices 1111 to 1114, may be automatically erased.

For example, the first to fourth way command queues 7141 to 7144 may re-queue unsuccessfully executed commands, and the re-queued commands may be applied to the respective device queue 610 of the first to fourth memory devices 1111 to 1114 and be queued.

As described above, the commands queued to the first to fourth way command queues 7141 to 7144 may be executed in-order or out-of-order, and in-place updated. In addition, the commands applied to the respective device queue 610 of the first to fourth memory devices 1111 to 1114 may be in-place updated.

The memory device 1100 may map all queues including the command way queue 714 and the device queue 610 to hidden queues and return the report queues in response to the get feature command.

In addition, the memory device 1100 may determine the command type, the physical address mapping information, the command queue slot number, or the device queue type, and queue the commands in response to a set feature command.

A command queue structure may be updated with an address and a command queue slot number corresponding to error correction failure or pass/fail of program/erase operations in the returned report queues. The command queue structure may be in-place updated.

In addition, when an exceptional case occurs, for example, when error correction fails or program/erase operations fail, queuing may be re-performed in a chip hold status.

FIG. 7 is a diagram illustrating a command queue structure and a report queue structure in accordance with an embodiment.

Referring to FIG. 7, the structure of the commands queued to the controller command queue 711 as shown in FIG. 6, i.e., the command queue structure may consist of a command type, a physical address mapping information, a command queue slot number, and a device queue information.

The command type may be information indicating one of a read command, a program command, and an erase command.

The physical address mapping information may include information indicating which way, among the first to fourth ways Way1 to Way4, a corresponding command is allocated to, e.g., information indicating which memory device is selected from among the first to fourth memory devices 1111 to 1114. In addition, the physical address mapping information may include a physical page address, a memory block address, and a column address by which the corresponding command is executed in a selected way.

For example, the command queue slot number may be information indicating which controller command queue, among N controller command queues, the corresponding command is queued to when each of the first to fourth way command queues 7141 to 7144 of FIG. 6 includes the N controller command queues. For example, the command queue slot number may be information indicating which controller command queue slot, among N controller command queue slots, the corresponding command is queued to when each of the first to fourth way command queues 7141 to 7144 includes the N controller command queue slots.

Alternatively, the command queue slot number may be information indicating which device command queue, among M device command queues, the corresponding command is queued to when each of the device queues 610 of FIG. 6 of the first to fourth memory devices 1111 to 1114 includes the M device command queues. For example, the command queue slot number may be information indicating which device command queue slot, among M device command queue slots, the corresponding command is queued to when each of the device queues 610 of FIG. 6 of the first to fourth memory devices 1111 to 1114 includes the M device command queue slots.

The device queue information may include information indicating whether the corresponding command is queued or aborted.

Report information on the commands executed by the first to fourth memory devices 1111 to 1114 as shown in FIG. 6, i.e., a report queue structure may consist of an exceptional case information, a physical address mapping information, a command queue slot number, and a device queue information.

The exceptional case information may include, for example, fail or pass of an error correction operation on data read by a read command, or pass or fail of a read, program, or erase operation.

The physical address mapping information may include information indicating which way, among the first to fourth ways Way1 to Way4, the corresponding command is allocated to, i.e., information indicating which memory device, among the first to fourth memory devices 1111 to 1114, the corresponding command is applied to, and a physical page address, a memory block address, and a column address by which the corresponding command is executed in the allocated way.

The device queue information may include information indicating whether the corresponding command is queued or aborted, or information indicating whether a corresponding way command queue to which the corresponding command is queued, among the first to fourth way command queues 7141 to 7144, is fully bounded.

The controller command queue 711 shown in FIG. 6 may change priority weights of the queued commands on the basis of the report queues, or determine a controller command queue slot number or a device command queue slot number on the basis of the command queue slot numbers in the report queues. For example, the first to fourth way command queues 7141 to 7144 of the controller command queue 711 may change a command queuing status in response to the report queues.

The memory device 1100 may map all queues including the command way queue 714 and the device queue 610 to hidden queues and return the report queues in response to a get feature command.

In addition, the memory device 1110 may determine the command type, the physical address mapping information, the command queue slot number, or the device queue type, and queue the commands in response to a set feature command.

A command queue structure may be updated with an address and a command queue slot number corresponding to an error correction failure or pass/fail of program/erase operations in the returned report queues. The command queue structure may be in-place updated. In addition, when an exceptional case occurs, for example, when error correction fails or a program/erase operation fails, queuing may be re-performed in a chip hold status.

FIG. 8 is a diagram illustrating a full-way interleave operation in accordance with an embodiment.

Referring to FIG. 8, the way throttler 713 may queue a plurality of commands to each of the first to fourth way command queues 7141 to 7144 of the command way queue 714. Subsequently, program commands queued to the first to fourth way command queues 7141 to 7144 may be sequentially applied to the first to fourth memory devices 1111 to 1114, and the first to fourth memory devices 1111 to 1114 may perform the program commands in parallel. For example, the way throttler 713 and the first to fourth way command queues 7141 to 7144 may control the first to fourth memory devices 1111 to 1114 to execute the program commands by performing a first full-way interleave operation. The first memory block MB1 110 may be allocated to execute a program command applied to the second memory device 1112.

During the first full-way interleave operation, for example, when a program operation corresponding to the program command executed by the first memory block MB1 110 of the second memory device 1112 fails, the second memory device 1112 may transfer exceptional case information, physical address mapping information, command queue slot number, and device queue information to the way throttler 713 through the second report queue.

For example, the exceptional case information may include information indicating that a program operation has failed.

The physical address mapping information may include information indicating which way, among the first to fourth ways Way1 to Way4, a corresponding command is allocated to, i.e., information indicating which memory device is selected from among the first to fourth memory devices 1111 to 1114.

In addition, the physical address mapping information may include information about a physical page address, a memory block address, and a column address by which the program command is executed. In the embodiment of FIG. 8, the physical address mapping information may include information indicating that the program command is applied to the second memory device 1112 configuring the second way Way2.

The first report queue, and third and fourth report queues may include information indicating that the commands executed by the first memory device 1111, and the third and fourth memory devices 1113 and 1114 are normally performed.

For example, the command queue slot number may be information indicating which controller command queue, among the N controller command queues, the corresponding command is queued to when each of the first to fourth way command queues 7141 to 7144 includes the N controller command queues. For example, the command queue slot number may be information indicating which controller command queue slot, among the N controller command queue slots, the corresponding command is queued to when each of the first to fourth way command queues 7141 to 7144 includes the N controller command queue slots.

Alternatively, the command queue slot number may be information indicating which device command queue, among M device command queues, the corresponding command is queued to when each of the device queues 610 of the first to fourth memory devices 1111 to 1114 includes the M device command queues. For example, the command queue slot number may be information indicating which device command queue slot, among the M device command queue slots, the corresponding command is queued to when each of the device queues 610 of FIG. 6 of the first to fourth memory devices 1111 to 1114 includes the M device command queue slots.

The device queue information may include information indicating whether the corresponding command is queued or aborted.

The second memory device 1112 may transfer the second report queue in response to the get feature command which is applied by the memory controller 1200. In addition, during the first full-way interleave operation, all operations corresponding to the program commands executed by the first memory device 1111 and third and fourth memory devices 1113 and 1114 may be successful.

The way throttler 713 may re-queue the program command to the second way command queue 7142 in the command way queue 714 in response to the second report queue received from the second memory device 1112.

In addition, the way throttler 713 may apply other program commands queued to the first way command queue 7141 and the third and fourth way command queues 7143 and 7144 to the first memory device 1111 and the third and fourth memory devices 1113 and 1114.

The way throttler 713 and the first to fourth way command queues 7141 to 7144 may control the first to fourth memory devices 1111 to 1114 to execute the program commands by performing a second full-way interleave operation. A command which is unsuccessfully executed during the first full-way interleave operation may be applied to the second memory device 1112. In addition, to perform the program commands applied to the second memory device 1112, the second memory block MB2 110, not the first memory block MB1 110 whose programming fails during the first full-way interleave operation may be allocated.

During the second full-way interleave operation, for example, when an operation corresponding to the program command executed by the second memory block MB2 110 of the second memory device 1112 fails, the second memory device 1112 may transfer exceptional case information, physical address mapping information, and command queue slot number to the way throttler 713 through the second report queue. The second memory device 1112 may transfer the second report queue in response to the get feature command which is applied by the memory controller 1200.

In addition, during the second full-way interleave operation, all operations corresponding to the program commands executed by the first memory device 1111 and the third and fourth memory devices 1113 and 1114 may be successful.

The way throttler 713 may re-queue the program command to the second way command queue 7142 in the command way queue 714 in response to the second report queue received from the second memory device 1112.

In addition, the way throttler 713 may apply other program commands queued to the first way command queue 7141 and the third and fourth way command queues 7143 and 7144 to the first memory device 1111 and the third and fourth memory devices 1113 and 1114.

The way throttler 713 and the first to fourth way command queues 7141 to 7144 may control the first to fourth memory devices 1111 to 1114 to execute the program commands by performing a third full-way interleave operation. A command which is unsuccessfully executed during the second full-way interleave operation may be applied to the second memory device 1112. In addition, to perform the program commands applied to the second memory device 1112, the third memory block MB3 110, not the first and second memory blocks MB1 and MB2 110 whose programming fails during the first and second full-way interleave operations, respectively, may be allocated.

All program operations corresponding to the program commands executed by the first to fourth memory devices 1111 to 1114 during the third full-way interleave operation may be successful.

By the above operations, the memory controller 1200 may control the memory devices 1111 to 1114 by full-way interleaving to thereby improve the performance of the memory system 1000.

Figure 9:
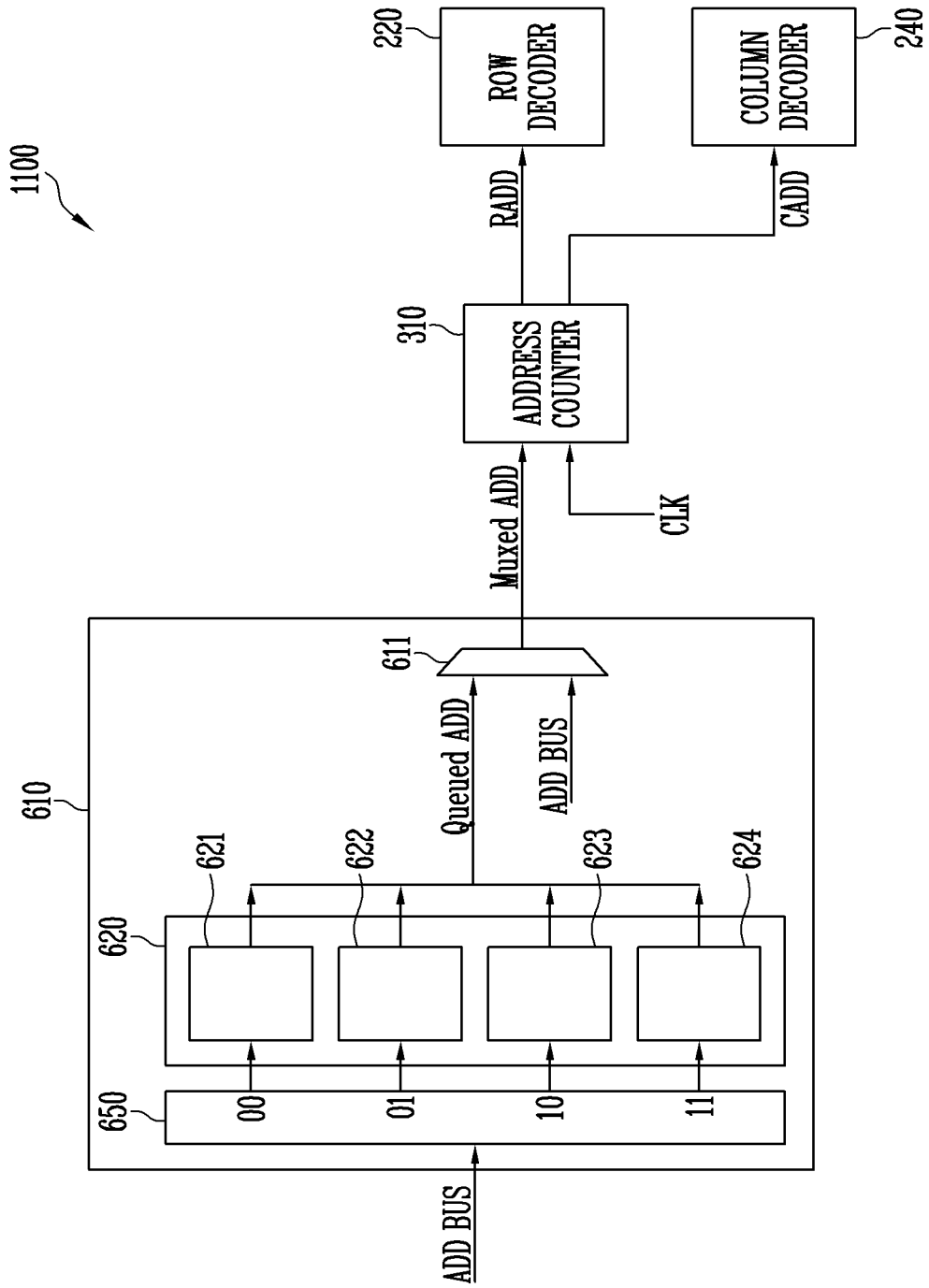
FIG. 9 is a diagram illustrating a full-way interleave operation in accordance with an embodiment.

FIG. 9 is a diagram illustrating an address path of the memory device 1100 in accordance with an embodiment.

Referring to FIG. 9, the memory device 1100 may further include the device queue 610 which is not included in the memory device 1100 of FIG. 4. The memory device 1100 may queue an address ADD corresponding to a command inputted from the command way queue 714 of the memory controller 1200 to the device queue 610. The address may be inputted through an address ADD bus. The device queue 610 may be included in the input/output circuit 250 of FIG. 4.

The device queue 610 may include a device address queue 620, and the device address queue 620 may include four device address queue slots 621 to 624. For example, the device address queue 620 may include addresses corresponding to a maximum of four commands. In addition, a device address queue slot number may be inputted together with the set feature command before the address is inputted. An address queue distributor 650 may allocate an address corresponding to the inputted command to each of the first to fourth device address queue slots 621 to 624 of the device address queue 620 on the basis of the device address queue slot number.

For example, when a device address queue slot number '00' is inputted, the address queue distributor 650 may control the corresponding address to be queued to the first device address command queue slot 621 of the device address queue 620. When a device address queue slot number '01' is inputted, the address queue distributor 650 may control the corresponding address to be queued to the second device address command queue slot 622 of the device address queue 620. In addition, when a device address queue slot number '10' is inputted, the address queue distributor 650 may control the corresponding address to be queued to the third device address command queue slot 623 of the device address queue 620. When a device address queue slot number '01' is inputted, the address queue distributor 650 may control the corresponding address to be queued to the fourth device address command queue slot 624 of the device address queue 620.

The memory device 1100 may directly input the address ADD corresponding to the command input through the address bus from the command way queue 714 of the memory controller 1200 to an address MUX 611 without queuing the address ADD to the device address queue 620. This address may be called a bypass address. The address MUX 611 may mux the queued ADD queued to the device address queue 620 and the bypass address directly inputted without being queued to the device address queue 620 to output the muxed address ADD. In addition, the address MUX 611 may perform the above-described muxing operation in synchronization with a clock signal CLK.

The muxed address ADD output from the address MUX 611 may be inputted to an address counter 310. The address counter 310 may generate a row address RADD and a column address CADD on the basis of the muxed address ADD input thereto. In addition, the row decoder 220 may select the memory block 110 and the physical page PPG in response to the row address RADD. In addition, the column decoder 240 may transfer data between the input/output circuit 250 and the page buffer group 230 in response to the column address CADD. For example, the column decoder 240 may exchange data with the page buffers 231 through data lines DL shown in FIG. 4, or may exchange data with the input/output circuit 250 through column lines CL. The address counter 310 may include the control logic 300 shown in FIG. 4.

Figure 10:
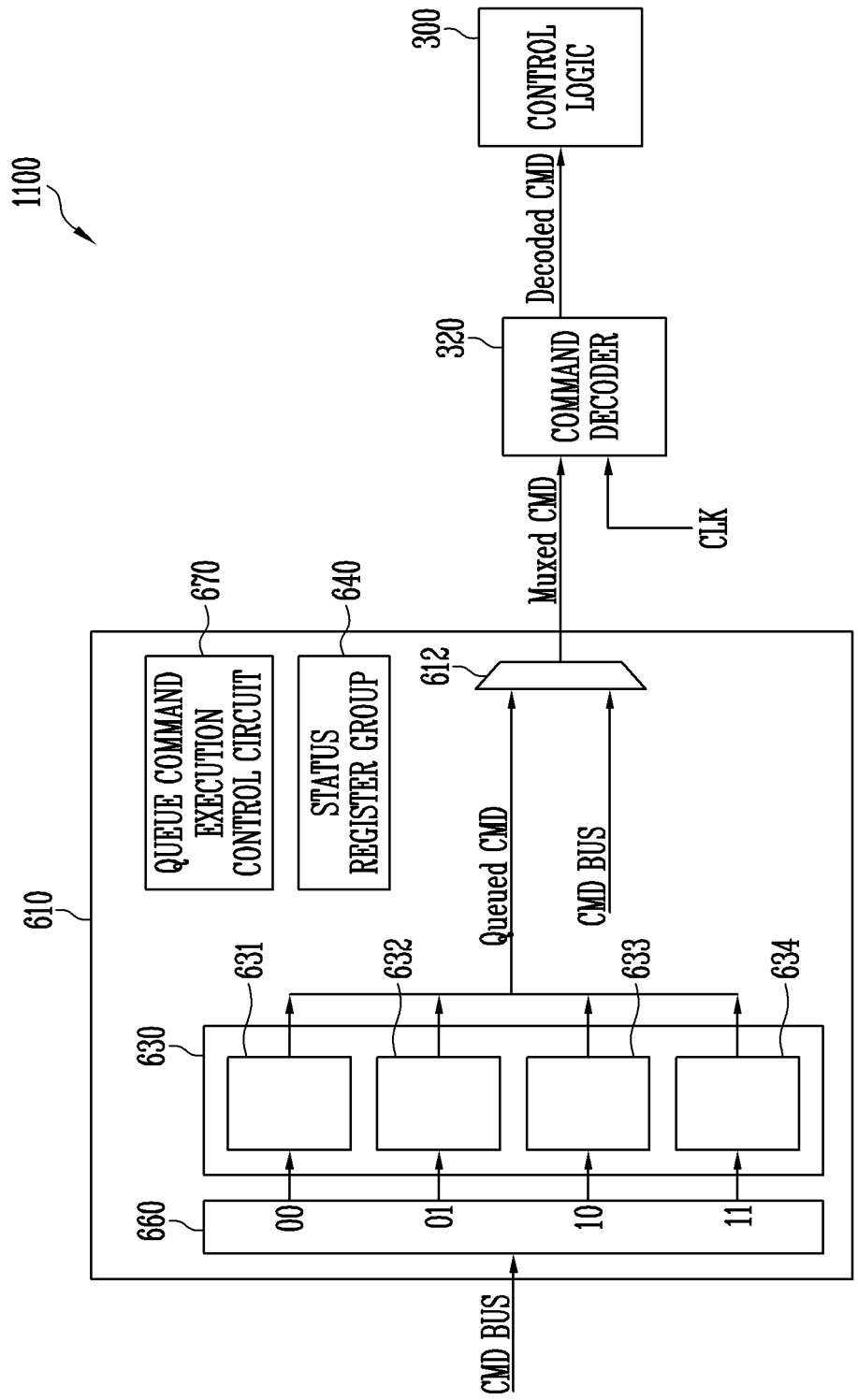
FIG. 10 is a diagram illustrating an address path of a memory device in accordance with an embodiment.

FIG. 10 is a diagram illustrating a command path of the memory device 1100 in accordance with an embodiment.

Referring to FIG. 10, the memory device 1100 may further include the device queue 610 which is not included in the memory device 1100 of FIG. 4. The memory device 1100 may queue a command inputted from the command way queue 714 of the memory controller 1200 to the device queue 610. The command may be inputted through a command CMD bus. The device queue 610 may be included in the input/output circuit 250 of FIG. 4.

The device queue 610 may further include a device command queue 630 in addition to the configuration of FIG. 9, and the device command queue 630 may include four device command queue slots 631 to 634. For example, the device command queue 630 may queue a maximum of four commands. In addition, a device command queue slot number may be inputted together with the set feature command before the command is inputted. A command queue distributor 660 may allocate the input command to each of the first to fourth device command queue slots 631 to 634 of the device command queue 630 on the basis of the device command queue slot number.

For example, when a device command queue slot number '00' is inputted, the command queue distributor 660 may control the corresponding command to be queued to the first device command queue slot 631 of the device command queue 630. When a device command queue slot number '01' is inputted, the command queue distributor 660 may control the corresponding command to be queued to the second device command queue slot 632 of the device command queue 630. In addition, when a device address queue slot number '10' is inputted, the command queue distributor 660 may control the corresponding command to be queued to the third device command queue slot 633 of the device command queue 630. When a device command queue slot number '11' is inputted, the command queue distributor 660 may control the corresponding command to be queued to the fourth device command queue slot 634 of the device command queue 630.

The memory device 1100 may directly input the command inputted through the command bus from the command way queue 714 of the memory controller 1200 to a command MUX 612 without queuing the command to the device command queue 630. This command may be called a bypass command. The address MUX 612 may mux the queued command CMD queued to the device command queue 630 and the bypass command directly inputted without being queued to the device command queue 630 to output the muxed address CMD. In addition, the command MUX 612 may perform the above-described muxing operation in synchronization with the clock signal CLK.

The muxed command CMD output from the command MUX 612 may be inputted to a command decoder 320. The command decoder 320 may generate a decoded command CMD on the basis of the input muxed command CMD, and the decoded command CMD may be inputted to the control logic 300. The command decoder 320 may be included in the input/output circuit 250 of FIG. 4.

The device queue 610 may further include a queue command execution control circuit 670. The queue command execution control circuit 670 may determine the execution order and method of a plurality of commands queued to the device command queue 630. For example, the queue command execution control circuit 670 may control the device command queue 630 so that the plurality of random program commands queued to the device command queue 630 may be executed in parallel. This will be described below in more detail.

The device queue 610 of the memory device 1100 may further include a status register group 640. This will be described below in more detail.

Figure 11:
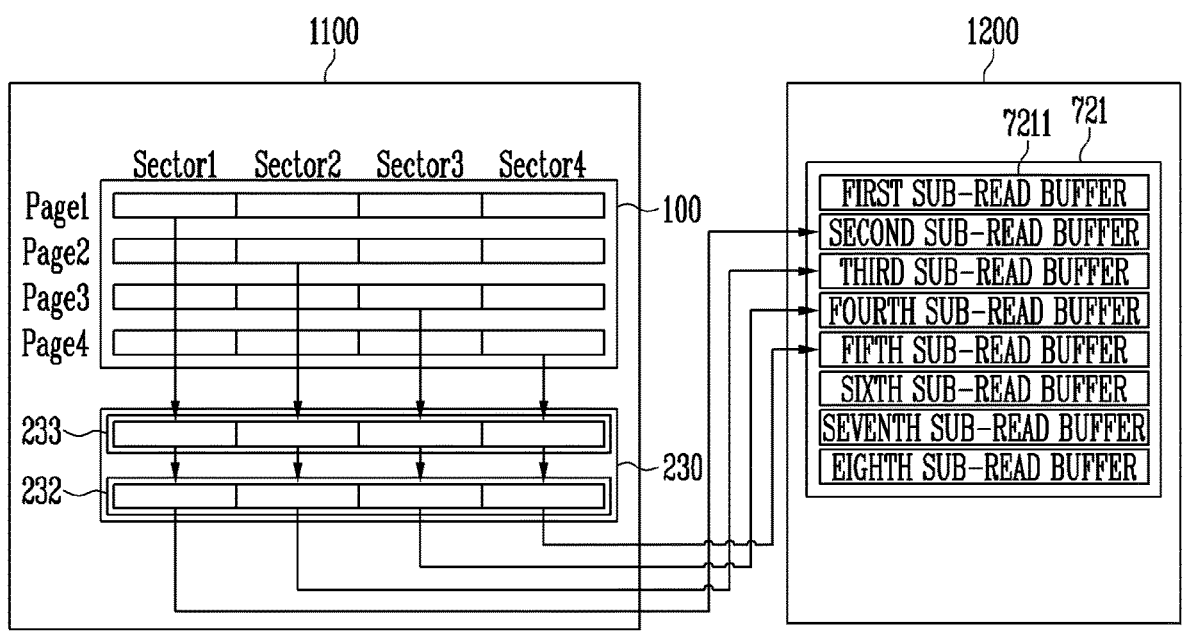
FIG. 11 is a diagram illustrating a command path of a memory device in accordance with an embodiment.

FIG. 11 is a diagram illustrating a random read operation in accordance with an embodiment.

Referring to FIG. 11, the memory device 1100 may execute commands for a plurality of random read operations in parallel. The memory device 1100 may receive a first command for reading data stored in a first sector Sector1 included in a first page Page1 from the memory controller 1200, and queue the first command to the first device command queue slot 631 in the device command queue 630 of the device queue 610. The memory device 1100 may receive a second command for reading data stored in a second sector Sector2 included in a second page Page2 from the memory controller 1200, and queue the second command to the second device command queue slot 632 in the device command queue 630 of the device queue 610. The memory device 1100 may receive a third command for reading data stored in a third sector Sector3 included in a third page Page3 from the memory controller 1200, and queue the third command to the third device command queue slot 633 in the device command queue 630 of the device queue 610. The memory device 1100 may receive a fourth command for reading data stored in a fourth sector Sector4 included in a fourth page Page4 from the memory controller 1200, and queue the fourth command to the fourth device command queue slot 634 in the device command queue 630 of the device queue 610.

Each of the sectors Sector1 to Sector4 may store 4 KB of data. For example, data corresponding to the first to fourth commands may be 4 KB. In addition, each of the pages Page1 to Page4 may store 16 KB of data, i.e., each page may have four sectors Sector1 to Sector4. It is noted, however, that the number of sectors in each page may vary by design.

The memory device 1100 may sequentially read the data corresponding to the first to fourth commands from the memory cell array 100 and store the sequentially read data in a main buffer group 233 of the page buffer group 230.

For example, the memory device 1100 may read the data corresponding to the first command from the first sector Sector1 of the first page Page1 of the memory cell array 100 and store the read data in the main buffer group 233 of the page buffer group 230. Subsequently, the memory device 1100 may read the data corresponding to the second command from the second sector Sector2 of the second page Page2 of the memory cell array 100, and store the read data in the main buffer group 233 of the page buffer group 230. Subsequently, the memory device 1100 may read the data corresponding to the third command from the third sector Sector3 of the third page Page3 of the memory cell array 1100, and store the read data in the main buffer group 233 of the page buffer group 230. Subsequently, the memory device 1100 may read the data corresponding to the fourth command from the fourth sector Sector4 of the fourth page Page4 of the memory cell array 1100, and store the read data in the main buffer group 233 of the page buffer group 230.

After the data corresponding to the first to fourth commands are stored in the main buffer group 233, the memory device 1100 may transfer the data corresponding to the first to fourth commands to a cash buffer group 232 of the page buffer group 230 at the same time. The memory device 1100 may then sequentially output the data corresponding to the first to fourth commands which are stored in the cache buffer group 232 to the memory controller 1200.

Figure 12:
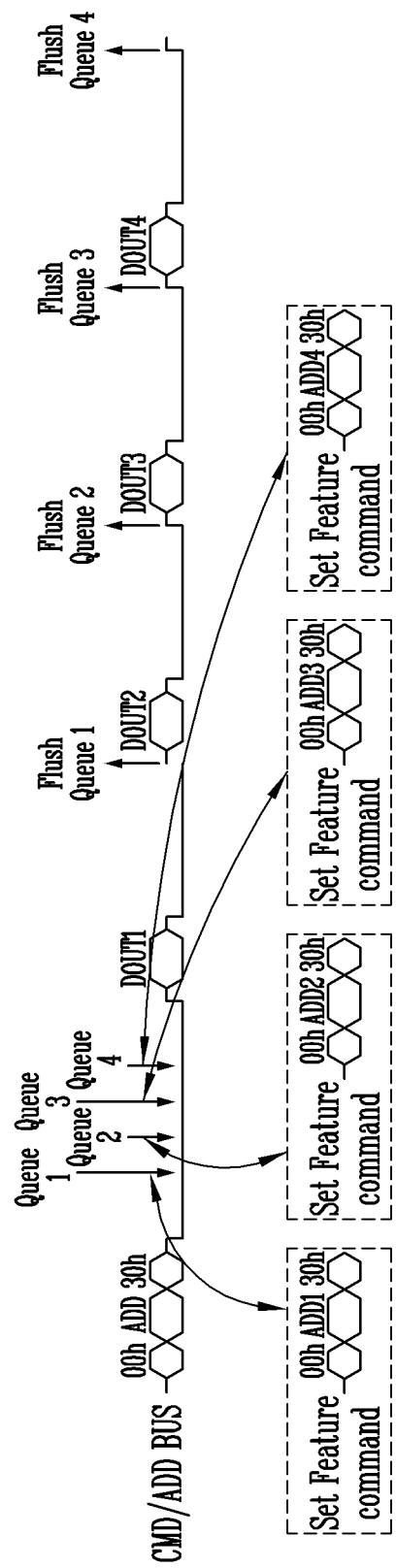
FIG. 12 is a diagram illustrating a random read operation in accordance with an embodiment.

For example, the memory device 1100 may output the data corresponding to the first command stored in the cache buffer group 232 to the memory controller 1200 (DOUT1 as shown in FIG. 12), and the memory controller 1200 may store the data corresponding to the first command received from the memory device 1100 to a second sub-read buffer 7211 of a read buffer 721. The read buffer 721 may be included in the memory buffer 720.

After the memory device 1100 outputs the data corresponding to the first command to the memory controller 1200, the memory device 1100 may complete and flush the first command queued to the device queue 610 (Flush Queue1 in FIG. 12).

Subsequently, the memory device 1100 may output the data corresponding to the second command stored in the cache buffer group 232 to the memory controller 1200 (DOUT2 as shown in FIG. 12), and the memory controller 1200 may store the data corresponding to the second command received from the memory device 1100 to a third sub-read buffer 7211 of the read buffer 721.

After the memory device 1100 outputs the data corresponding to the second command to the memory controller 1200, the memory device 1100 may complete and flush the second command queued to the device queue 610 (Flush Queue2 in FIG. 12).

In addition, the memory device 1100 may output the data corresponding to the third command stored in the cache buffer group 232 to the memory controller 1200 (DOUT3 as shown in FIG. 12), and the memory controller 1200 may store the data corresponding to the third command received from the memory device 1100 to a fourth sub-read buffer 7211 of the read buffer 721.

After the memory device 1100 outputs the data corresponding to the third command to the memory controller 1200, the memory device 1100 may complete and flush the third command queued to the device queue 610 (Flush Queue3 in FIG. 12).

Subsequently, the memory device 1100 may output the data corresponding to the fourth command stored in the cache buffer group 232 to the memory controller 1200 (DOUT4 as shown in FIG. 12), and the memory controller 1200 may store the data corresponding to the fourth command received from the memory device 1100 to a fifth sub-read buffer 7211 of the read buffer 721.

After the memory device 1100 outputs the data corresponding to the fourth command to the memory controller 1200, the memory device 1100 may complete and flush the fourth command queued to the device queue 610 (Flush Queue4 in FIG. 12).

The queue command execution control circuit 670 shown in FIG. 10 may control the device command queue 630 to perform above-described operations.

The read buffer 721 of the memory buffer 720 may include first to eighth sub-read buffers 7211. In addition, each of the sub-read buffers 7211 may store 4 KB of data. It is noted, that the number of sub-read buffers and the data storing capacity of each sub-read buffer may vary by design.

As described above, performance of a random read operation may be improved by queuing and executing commands for a plurality of random read operations in parallel by using the queue command execution control circuit 670 of the device queue 610. For example, the queue command execution control circuit 670 may control the device command queue 630 so that the plurality of random read commands queued to the device command queue 630 may be executed in parallel. In addition, when the commands queued to the device command queue 630 are commands for a random read operation, the queue command execution control circuit 670 may control the device command queue 630 so that the commands queued to the device command queue 630 may be sequentially completed and flushed.

FIG. 12 is a timing diagram illustrating a random read operation in accordance with an embodiment. FIG. 12 is a detailed view of a data exchange between commands, addresses, and data between the memory device 1100 and the memory controller 1200 during the random read operation described above with reference to FIG. 11.

Referring to FIG. 12, the memory device 1100 may receive commands for a plurality of random read operations from the memory controller 1200. The memory controller 1200 may first sequentially apply a read command ooh, a read address ADD, and a confirm command 30h to the memory device 1100 through a command/address CMD/ADD bus. The memory device 1100 may queue the plurality of commands in response to a set feature command.

For example, the memory controller 1200 may sequentially apply the read command 00h, the read address ADD, and the confirm command 30h to the memory device 1100, and may subsequently apply the set feature command for queuing the plurality of commands. The memory device 1100 may set the device queue 610 for queuing the plurality of commands in response to the set feature command.

Subsequently, the memory controller 1200 may apply the read command ooh, a first read address ADD1, and the confirm command 30h to the memory device 1100. The first read address ADD1 may correspond to the first sector Sector1 of the first page Page1 of FIG. 11.

Subsequently, the memory controller 1200 may apply the read command ooh, a second read address ADD2, and the confirm command 30h to the memory device 1100. The second read address ADD2 may correspond to the second sector Sector2 of the second page Page2 of FIG. 11.

In addition, the memory controller 1200 may apply the read command ooh, a third read address ADD3, and the confirm command 30h to the memory device 1100. The third read address ADD3 may correspond to the third sector Sector3 of the third page Page3 of FIG. 11.

Lastly, the memory controller 1200 may apply the read command 00h, a fourth read address ADD4, and the confirm command 30h to the memory device 1100. The fourth read address ADD4 may correspond to the fourth sector Sector4 of the fourth page Page4 of FIG. 11.

The memory device 1100 may sequentially read data corresponding to the first to fourth commands from the memory cell array 100 during a read elapsed time tR, and store the read data in the main buffer group 231 of the page buffer group 230 as described above with reference to FIG. 11 in response to the queued first to fourth commands.

Subsequently, the memory device 1100 may transfer the data corresponding to the first to fourth commands stored in the main buffer group 233 to the cache buffer group 232 of the page buffer group 230 at the same time.

After the data corresponding to the first to fourth commands are stored in the cache buffer group 232 of the page buffer group 230, the memory controller 1200 may apply the first data output command DOUT1 to the memory device 1100.

In response to the first data output command DOUT1, the memory device 1100 may output the data corresponding to the first command stored in the cache buffer group 232 to the memory controller 1200.

The memory controller 1200 may store the data corresponding to the first command received from the memory device 1100 in the second sub-read buffer 7211 of the read buffer 721 shown in FIG. 11.

After the memory device 1100 outputs the data corresponding to the first command to the memory controller 1200, the memory device 1100 may complete and flush the first command queued to the device queue 610 (Flush Queue1).

The above operations may be performed by the queue command execution control circuit 670.

Subsequently, the memory controller 1200 may apply the second data output command DOUT2 to the memory device 1100, and the memory device 1100 may output the data corresponding to the second command stored in the cache buffer group 232 to the memory controller 1200 in response to the second data output command DOUT2.

The memory controller 1200 may store the data corresponding to the second command received from the memory device 1100 in the third sub-read buffer 7211 of the read buffer 721 shown in FIG. 11.

After the memory device 1100 outputs the data corresponding to the second command to the memory controller 1200, the memory device 1100 may complete and flush the second command queued to the device queue 610 (Flush Queue2).

In addition, the memory controller 1200 may apply the third data output command DOUT3 to the memory device 1100, and the memory device 1100 may output the data corresponding to the third command stored in the cache buffer group 232 to the memory controller 1200 in response to the third data output command DOUT3.

The memory controller 1200 may store the data corresponding to the third command received from the memory device 1100 in the fourth sub-read buffer 7211 of the read buffer 721 shown in FIG. 11.

After the memory device 1100 outputs the data corresponding to the third command to the memory controller 1200, the memory device 1100 may complete and flush the third command queued to the device queue 610 (Flush Queue3).

The queue command execution control circuit 670 shown in FIG. 10 may control the device command queue 630 to perform above-described operations.

Lastly, the memory controller 1200 may apply the fourth data output command DOUT4 to the memory device 1100, and the memory device 1100 may output the data corresponding to the fourth command stored in the cache buffer group 232 to the memory controller 1200 in response to the fourth data output command DOUT4.

The memory controller 1200 may store the data corresponding to the fourth command received from the memory device 1100 in the fifth sub-read buffer 7211 of the read buffer 721 shown in FIG. 11.

After the memory device 1100 outputs the data corresponding to the fourth command to the memory controller 1200, the memory device 1100 may complete and flush the fourth command queued to the device queue 610 (Flush Queue2).

The above operations may be performed by the queue command execution control circuit 670.

As described above, performance of a random read operation may be improved since the memory device 1100 may queue and execute commands for a plurality of random read operations in parallel by using the device queue 610. For example, the queue command execution control circuit 670 may control the device command queue 630 so that the plurality of random program commands queued to the device command queue 630 may be executed in parallel.

In addition, when the commands queued to the device command queue 630 are commands for a random program operation, the queue command execution control circuit 670 may control the device command queue 630 so that the commands queued to the device command queue 630 may be simultaneously completed and flushed.

Figure 13:
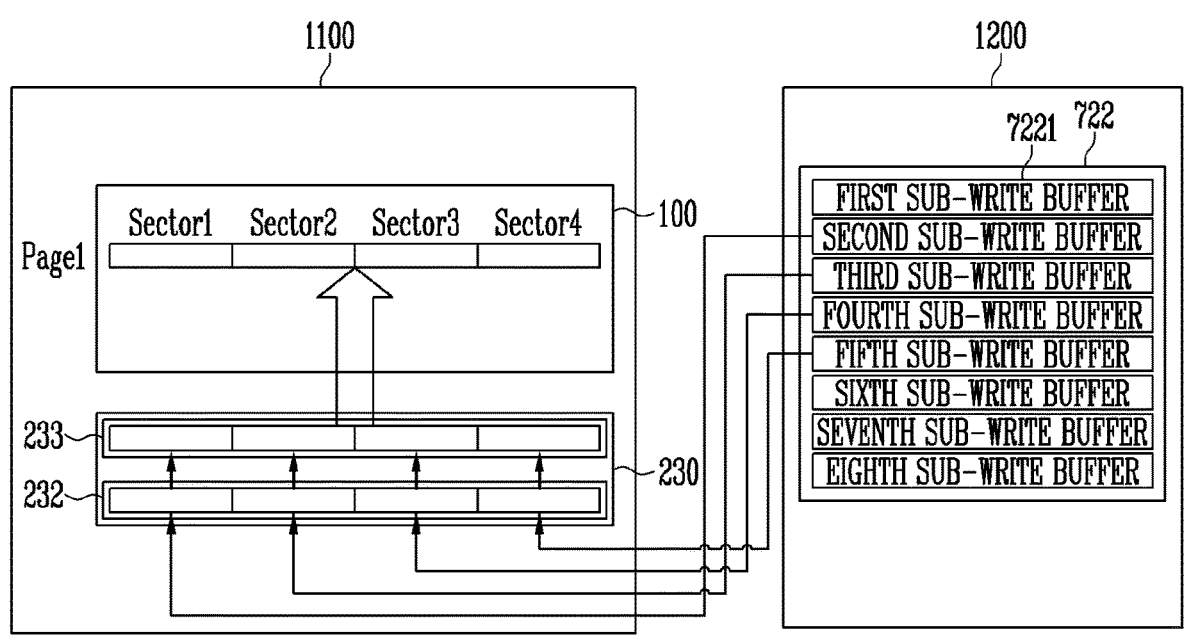
FIG. 13 is a timing diagram illustrating a random read operation in accordance with an embodiment.

FIG. 13 is a diagram illustrating a random program operation in accordance with an embodiment.

Referring to FIG. 13, the memory device 1100 may execute commands for a plurality of random program operations in parallel.

The memory device 1100 may receive the first command for programming the first sector Sector1 included in the first page Page1 with first data from the memory controller 1200, queue the first command to the first device command queue slot 631 in the device command queue 630 of the device queue 610, and store the first data in the cache buffer group 232 of the page buffer group 230.

The memory device 1100 may receive the second command for programming the second sector Sector2 included in the first page Page1 with second data from the memory controller 1200, queue the second command to the second device command queue slot 632 in the device command queue 630 of the device queue 610, and store the second data in the cache buffer group 232 of the page buffer group 230.

The memory device 1100 may receive the third command for programming the third sector Sector3 included in the first page Page1 with third data from the memory controller 1200, queue the third command to the third device command queue slot 633 in the device command queue 630 of the device queue 610, and store the third data in the cache buffer group 232 of the page buffer group 230.

The memory device 1100 may receive the fourth command for programming the fourth sector Sector4 included in the first page Page1 with fourth data from the memory controller 1200, queue the fourth command to the third device command queue slot 634 in the device command queue 630 of the device queue 610, and store the fourth data in the cache buffer group 232 of the page buffer group 230.

Each of the sectors Sector1 to Sector4 may store 4 KB of data. For example, the data of each of the first to fourth commands may be 4 KB. In addition, a single page, for example, the page Page1 may store 16 KB of data.

The memory controller 1200 may sequentially transfer the first to fourth data stored in a write buffer 722 to the memory device 1100. The write buffer 722 may be included in the memory buffer 720. In addition, the write buffer 722 may include first to eighth sub-write buffers 7221.

First, the memory controller 1200 may transfer the first data stored in the second sub-write buffer 7221 of the write buffer 722 to the cache buffer group 232 of the memory device 1100, and the memory device 1100 may store the first data in the cache buffer group 232.

Subsequently, the memory controller 1200 may transfer the second data stored in the third sub-write buffer 7221 of the write buffer 722 to the cache buffer group 232 of the memory device 1100, and the memory device 1100 may store the second data in the cache buffer group 232.

In addition, the memory controller 1200 may transfer the third data stored in the fourth sub-write buffer 7221 of the write buffer 722 to the cache buffer group 232 of the memory device 1100, and the memory device 1100 may store the third data in the cache buffer group 232.

Lastly, the memory controller 1200 may transfer the fourth data stored in the fifth sub-write buffer 7221 of the write buffer 722 to the cache buffer group 232 of the memory device 1100, and the memory device 1100 may store the fourth data in the cache buffer group 232.

The above-described operations may be controlled by the queue command execution control circuit 670.

The memory device 1100 may transfer the data corresponding to the first to fourth data stored in the cache buffer group 232 to the main buffer group 233 of the page buffer group 230 at the same time.

Subsequently, the memory device 1100 may program the first to fourth sectors Sector1 to Sector4 of the first page Page1 of the memory cell array 100 with the first to fourth data stored in the main buffer group 233 at the same time.

Subsequently, the memory device 1100 may simultaneously complete and flush the first to fourth commands queued to the device queue 610 (Flush Queue1 to Queue4).

The above-described operations may be controlled by the queue command execution control circuit 670. The write buffer 722 of the memory buffer 720 may include the first to eighth sub-write buffers 7221. In addition, each of the first to eighth sub-write buffers 7221 may have 4 KB of data.

As described above, performance of a random program operation may be improved by queuing and executing commands for a plurality of random program operations in parallel by using the queue command execution control circuit 670 of the device queue 610.

Figure 14:
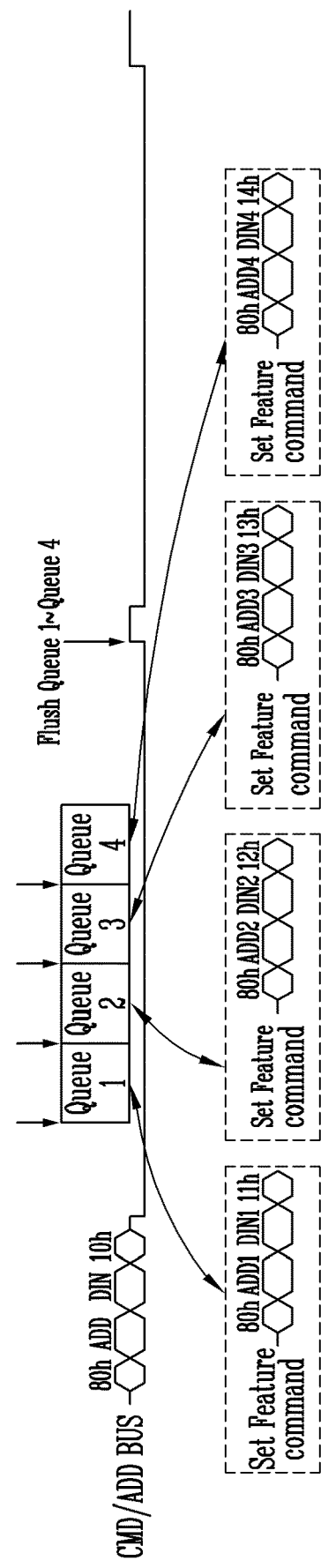
FIG. 14 is a diagram illustrating a random program operation in accordance with an embodiment.

FIG. 14 is a timing diagram illustrating a random program operation in accordance with an embodiment. FIG. 14 is a detailed view of a data exchange between commands, addresses, and data between the memory device 1100 and the memory controller 1200 during the random program operation described above with FIG. 13.

Referring to FIG. 14, the memory device 1100 may receive commands for a plurality of random program operations from the memory controller 1200. The memory controller 1200 may first sequentially apply a program command 80h, a program address ADD, and a confirm command 10h to the memory device 1100 through a command/address CMD/ADD bus.

The memory device 1100 may queue a plurality of commands in response to a set feature command.

For example, the memory controller 1200 may sequentially apply the program command 80h, the program address ADD, program data DIN, and the first confirm command 10h to the memory device 1100, and apply a set feature command for queuing program commands. The memory device 1100 may set the device queue 610 for queuing the plurality of commands in response to the set feature command.

Subsequently, the memory controller 1200 may apply the program command 80h, a first program address ADD1, first program data DIN1, and a second confirm command 11h to the memory device 1100 (Queue1 in FIG. 14).

The memory device 1100 may store the first data in the cache buffer group 232. The first program address ADD1 may correspond to the first sector Sector1 of the first page Page1 of FIG. 13. In addition, the first data may have 4 KB of data.

Subsequently, the memory controller 1200 may apply the program command 80h, a second program address ADD2, second program data DIN2, and the second confirm command 11h (Queue2 in FIG. 14).

The memory device 1100 may store the second data in the cache buffer group 232. The second program address ADD2 may correspond to the second sector Sector2 of the first page Page1 of FIG. 13. In addition, the second data may have 4 KB of data.

Subsequently, the memory controller 1200 may apply the program command 80h, a third program address ADD3, third program data DIN3, and the second confirm command 11h (Queue2 in FIG. 14).

The memory device 1100 may store the third data in the cache buffer group 232. The third program address ADD3 may correspond to the third sector Sector3 of the first page Page1 of FIG. 13. In addition, the third data may have 4 KB of data.

Lastly, the memory controller 1200 may apply the program command 80h, a fourth program address ADD4, fourth program data DIN4, and the second confirm command 11h to the memory device 1100 (Queue2 in FIG. 14).

The memory device 1100 may store the fourth data in the cache buffer group 232. The fourth program address ADD4 may correspond to the fourth sector Sector4 of the first page Page1 of FIG. 13. In addition, the fourth data may have 4 KB of data.

The memory device 1100 may transfer the first to fourth data stored in the cache buffer group 232 to the main buffer group 233 at the same time.

In addition, the memory device 1100 may program the first to fourth sectors Sector1 to Sector4 of the first page Page1 with the first to fourth data stored in the main buffer group 233 at the same time.

After the memory device 1100 completely programs the first to fourth sectors Sector1 to Sector4 of the first page Page1 with the first to fourth data, the memory device 110 may complete and flush the first to fourth commands queued to the device queue 610 (Flush Queue1 to Queue4).

The above operations may be performed by the queue command execution control circuit 670.

As described above, since the memory device 1100 queues and executes commands for a plurality of random program operations in parallel by using the device queue 610, performance of a random program operation may be improved.

Figure 15:
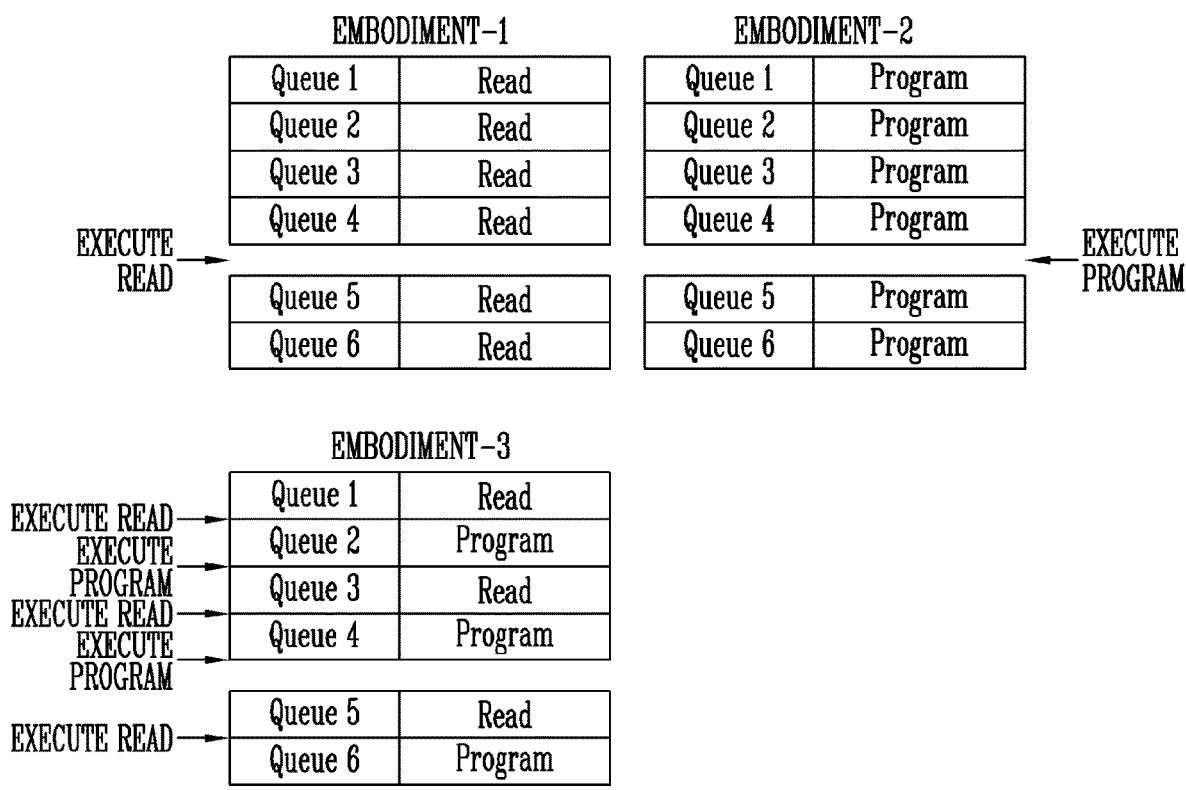
FIG. 15 is a timing diagram illustrating a random program operation in accordance with an embodiment.

FIG. 15 is a diagram illustrating a command execution method in accordance with an embodiment.

Referring to FIG. 15, in a first example (denoted "EMBODIMENT-1" in FIG. 15), the device queue 610 of the memory device 1100 may include four device command queues, i.e., first to fourth device command queue slots 631 to 634.

For example, the memory device 1100 may receive a plurality of commands for random read operations from the memory controller 1200.

When the first to fourth device command queue slots 631 to 634 of the device queue 610 are all filled with read commands, the memory device 1100 may simultaneously or sequentially execute the read commands occupying the first to fourth device command queue slots 631 to 634 of the device queue 610 to store the first to fourth read data corresponding to the first to fourth read data in the main buffer group 233 of the page buffer group 230.

Subsequently, the memory device 1100 may simultaneously transfer the first to fourth read data stored in the main buffer group 233 to the cache buffer group 232, and the first to fourth read data stored in the cache buffer group 232 may be sequentially output to the memory controller 1200.

After outputting the first read data to the memory controller 1200, the memory device 1100 may complete and flush the read command of the first device command queue slot 631. When a command occupying a device command queue slot is completed and flushed, it means that the corresponding device command queue slot may be able to queue a new command.

The memory device 1100 may sequentially perform the above operations on the second to fourth read data.

Subsequently, the memory device 1100 may queue additional read commands to the first to fourth device command queue slots 631 to 634.

In a second example (denoted "EMBODIMENT-2" in FIG. 15), the memory device 1100 may receive a plurality of commands for random program operations from the memory controller 1200.

When the first to fourth device command queue slots 631 to 634 of the device queue 610 are all filled with program commands, the memory device 1100 may simultaneously execute the program commands occupying the first to fourth device command queue slots 631 to 634 of the device queue 610. For example, the memory device 1100 may simultaneously transfer the first to fourth program data corresponding to the first to fourth commands stored in the cache buffer group 232 to the main buffer group 233.

Subsequently, the memory device 1100 may program the memory cell array 100 with the first to fourth program data stored in the main buffer group 233.

The memory device 1100 may simultaneously complete and flush the program commands of the first to fourth device command queue slots 631 to 634 after the program operation on the first to fourth program data is completed.

Subsequently, the memory device 1100 may queue additional program commands to the first to fourth command queue slots.

In a third example (denoted "EMBODIMENT-3" in FIG. 15), the memory device 1100 may alternately receive a command for a random read operation and a command for a random program operation from the memory controller 1200.

The memory device 1100 may receive a command for a read operation from the memory controller 1200 and queue the command for the read operation to the first device command queue slot 631. Subsequently, the memory device 1100 may receive a command for a program operation from the memory controller 1200.

The memory device 1100 may immediately execute the command for the read operation which occupies the first device command queue slot 631. For example, the memory device 1100 may not await a command for an additional random read operation and may directly execute the read command occupying the first device command queue slot 631.

The above operations may be performed by the queue command execution control circuit 670.

After executing the read command occupying the first command queue slot, the memory device 1100 may receive the command for the program operation and queue the received command program operation to the second device command queue slot 632.

Subsequently, the memory device 1100 may receive a command for a read operation from the memory controller 1200.

The memory device 1100 may immediately execute the command for the program operation which occupies the second device command queue slot 632. For example, the memory device 1100 may not await a command for an additional random program operation and may directly execute the program command occupying the second device command queue slot 632.

The above operations may be performed by the queue command execution control circuit 670.

After executing the program command occupying the second device command queue slot 632, the memory device 1100 may receive a command for a read operation and queue the received command to the third device command queue slot 633.

Subsequently, the memory device 1100 may receive a command for a program operation from the memory controller 1200.

The memory device 1100 may immediately execute the command for the read operation which occupies the third device command queue slot 633. For example, the memory device 1100 may not await a command for an additional random read operation and may directly execute the read command occupying the third device command queue slot 633.

The above operations may be performed by the queue command execution control circuit 670.

After executing the program command occupying the third device command queue slot 633, the memory device 1100 may receive a command for a program operation and queue the received command to the fourth device command queue slot 634.

Subsequently, the memory device 1100 may receive a command for a read operation from the memory controller 1200.

The memory device 1100 may immediately execute the command for the program operation which occupies the fourth device command queue slot 634. For example, the memory device 1100 may not await a command for an additional random program operation and may directly execute the command occupying the fourth device command queue slot 634.

The above operations may be performed by the queue command execution control circuit 670.

Figure 16:
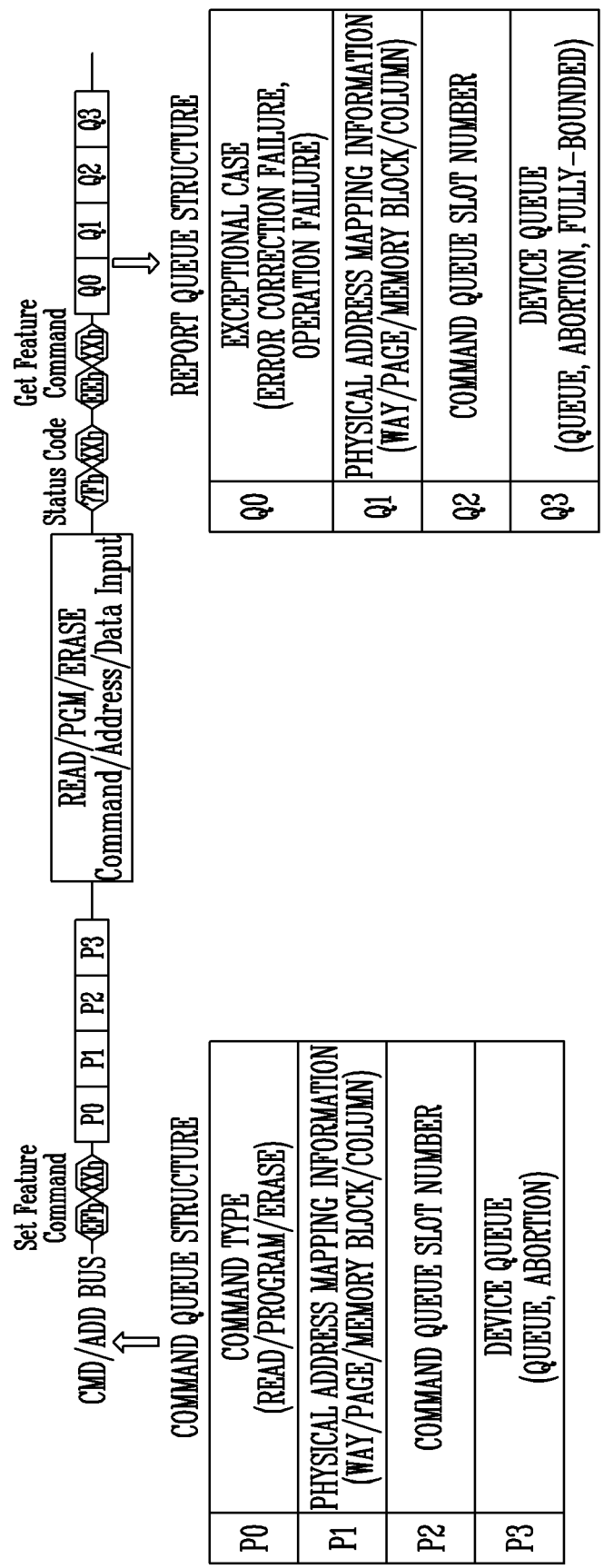
FIG. 16 is a timing diagram illustrating a work load processing method in accordance with an embodiment.

FIG. 16 is a diagram illustrating a command queue interface of the memory device 1100 in accordance with an embodiment.

Referring to FIG. 16, the memory controller 1200 may set the device queue 610 of the memory device 1100 by using a set feature command before queuing a plurality of commands to the memory device 1100. A command queue structure inputted to the memory device 1100 from the memory controller 1200 may be the same as described above with reference to FIG. 7. The memory controller 1200 may apply a set feature command EFh or XXh to the memory device 1100 through the command/address CMD/ADD bus and input a plurality of information P0 to P3 about the command queue structure. Subsequently, the memory controller 1200 may input commands, addresses, and data for a read, program, or an erase operation to the memory device 1100. In FIG. 16, the set feature commands EFh and XXh are shown as an example. However, the invention is not limited thereto.

The device queue 610 of the memory device 1100 may include the status register group 640, and the status register group 640 may store execution statuses of the commands queued to the device queue 610. For example, when a command is executed to perform a program operation, the memory device 1100 may store a pass or fail of the corresponding program operation, i.e., information whether or not the command is normally terminated may be stored in the status register group.

The memory controller 1200 may input status codes 7Fh and XXh and get feature commands EEh and XXh to the memory device 1100. In FIG. 16, the status codes 7Fh and XXh and the get feature commands EEh and XXh are shown as an example. However, the invention is not limited thereto. The memory device 1100 may output a report queue including a plurality of information Q0 to Q3 about the execution of the queued command to the memory controller 1200 in response to a status code and a get feature command. A report queue structure may be the same as described above with reference to FIG. 7.

FIG. 17 is a diagram illustrating a configuration of the status register group 640 of the memory device 1100 in accordance with an embodiment.

Referring to FIG. 17, information stored in the status register group 640 of the memory device 1100 may be transferred through eight input/output (IO) pins in response to the status code and the get feature command.

The status register group 640 may include first to eight-status registers SR<1> to SR<8>. The information stored in the first status register SR<1> and transferred through the first input/output pin IO<1> may indicate whether the corresponding command passes or fails. For example, when the status register group 640 of the memory device 1100 is '7Fh', information '1' may be stored in the first status register SR<1> and transferred through the first input/output pin IO<1>, and may indicate that the execution of the corresponding command fails.

Information that is stored in the second status register SR<2> and transferred through the second input/output pin IO<2> may indicate whether the device queue 610 is fully bounded. When the device queue 610 includes the first to fourth device command queues 631 to 634, if the device queue 610 is fully bounded, it may indicate that each of the first to fourth device command queues 631 to 634 queues commands. For example, when the information stored in the status register group 640 of the memory device 1100 is '7Fh', information '1' may be stored in the second status register SR<2> and transferred through the second input/output pin IO<2>, and may indicate that the device queue 610 is fully bounded.

Information which is stored in the third status register SR<3> and transferred through the third input/output pin IO<3> may indicate whether a command is queued or not, i.e., may be a queue flag. For example, when the information stored in the status register group 640 of the memory device 1100 is '7Fh', information '1' may be stored in the third status register SR<3> and transferred through the third input/output pin IO<3>, and may indicate that the command is queued.

Information which is stored in the fourth status register SR<4> and transferred through the fourth input/output pin IO<4> may be information indicating whether a command is aborted or not, i.e., may be an abort flag. For example, when the information stored in the status register group 640 of the memory device 1100 is '7Fh', information '1' may be stored in the fourth status register SR<4> and transferred through the fourth input/output pin IO<4>, and may indicate that the command is aborted.

Information which is stored in the fifth status register SR<5> and transferred through the fifth input/output pin IO<5> may indicate whether a command is suspended or not. For example, when the status register group 640 of the memory device 1100 is '7Fh', information '1' may be stored in the fifth status register SR<5> and transferred through the fifth input/output pin IO<5>, and may indicate that a program or erase command is suspended.

Information which is stored in the sixth status register SR<6> and transferred through the sixth input/output pin IO<6> may indicate internal ready or busy status. For example, when the status register group 640 of the memory device 1100 is '7Fh', information '1' may be stored in the sixth status register SR<6> and transferred through the sixth input/output pin IO<6>, and may indicate an internal ready status.

Information which is stored in the seventh status register SR<7> and transferred through the seventh input/output pin IO<7> may indicate an external ready or busy status. For example, when the status register group 640 of the memory device 1100 is '7Fh', information '1' may be stored in the seventh status register SR<7> and transferred through the seventh input/output pin IO<7>, and may indicate an external ready status.

For example, the eight-status register SR<8> may be reserved.

Figure 18:
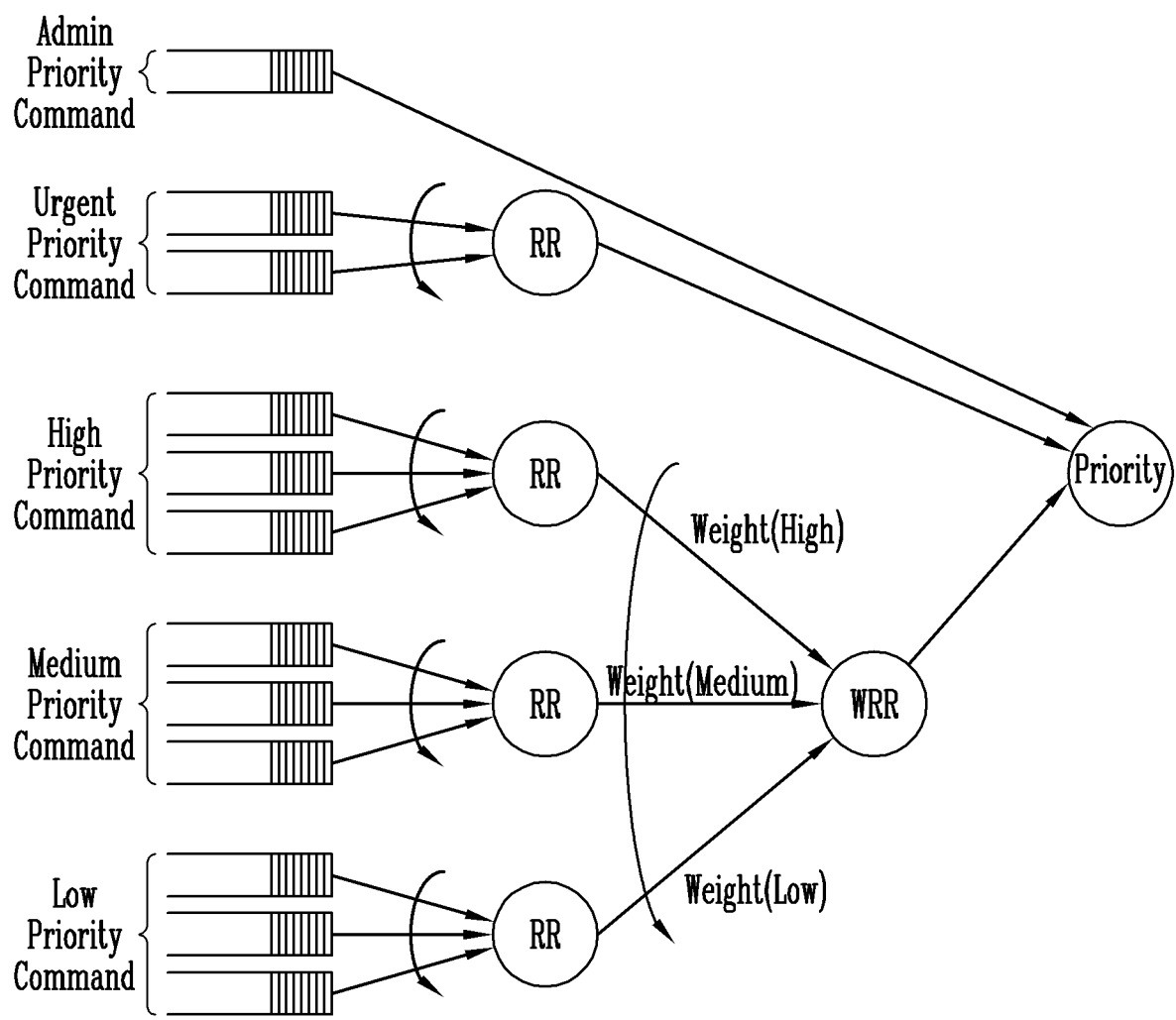
FIG. 18 is a timing diagram illustrating the configuration of a state register of a memory device in accordance with an embodiment.

FIG. 18 is a diagram illustrating exemplary operations of the command priority processor 712 of FIG. 6.

Referring to FIG. 18, when a plurality of commands are inputted from the host 2000, the memory controller 1200 of the memory system 1000 may queue commands inputted to the controller command queue 711. In addition, the memory controller 1200 of the memory system 1000 may queue a plurality of internal commands related to a house keeping operation in the memory system 1000 to the controller command queue 711.

An execution order of the plurality of commands queued to the controller command queue 711 may be determined according to priority weights assigned by the command priority processor 712. For example, the command priority processor 712 may assign priority weights to the plurality of commands inputted from the host 2000 and the internal commands for determining an execution order of these commands.

For example, the command priority processor 712 may assign at least one of an admin priority, an urgent priority, a high priority, a medium priority, and a low priority to each of the plurality of commands. The execution order of the plurality of commands may be determined according to the assigned priority weights. For example, the command priority processor 712 may assign a higher priority weight to a read command, among the plurality of commands, than to a program command, and vice versa.

Commands to which the admin priority is assigned by the command priority processor 712 may be executed with highest priority without contending with the other commands. In addition, commands to which the urgent priority is assigned by the command priority processor 712 may be queued in a round robin (RR) fashion and executed with higher priority than commands to which the high priority, the medium priority, and the low priority are assigned.

Commands to which the high priority, the medium priority, and the low priority is assigned by the command priority processor 712 may be queued in a weighted round robin (RR) fashion with a priority weight, and the execution order may be determined such that the commands to which the high priority, the medium priority, and the low priority are assigned may be executed later than the commands to which the admin priority and the urgent priority are assigned.

Figure 19:
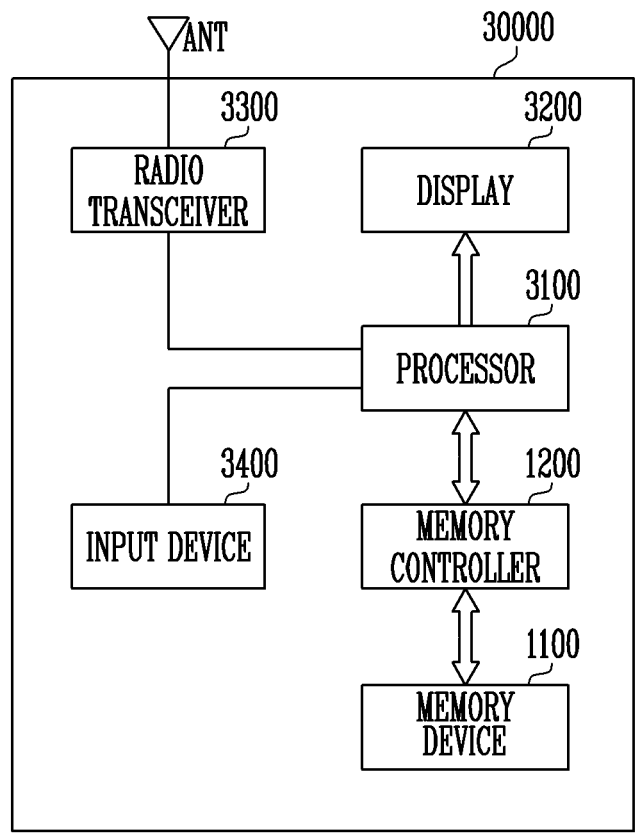
FIG. 19 is a diagram illustrating an embodiment of a memory system including a memory controller as shown in FIG. 2.

FIG. 19 is a diagram illustrating an embodiment (30000) of the memory system 1000 including the memory controller 1200 as shown in FIG. 2.

Referring to FIG. 19, a memory system 30000 may be embodied into a cellular phone, a smart phone, a tablet PC, a personal digital assistant (PDA), or a wireless communication device. The memory system 30000 may include the memory device 1100 and the memory controller 1200 for controlling the operations of the memory device 1100. The memory controller 1200 may control a data access operation of the memory device 1100, for example, a program operation, an erase operation or a read operation in response to control of the processor 3100.

The memory controller 1200 may control data programmed into the memory device 1100 to be displayed through a display 3200.

A radio transceiver 3300 may transmit and receive a radio signal through an antenna ANT. The radio transceiver 3300 may change the radio signal received through the antenna ANT into a signal which can be processed by the processor 3100. The processor 3100 may process the signal received from the radio transceiver 3300 and transfer the processed signal to the memory controller 1200 or to the display 3200. The memory controller 1200 may program the signal processed by the processor 3100 into the semiconductor memory device 1100. In addition, the radio transceiver 3300 may change a signal outputted from the processor 3100 into a radio signal, and transmit the radio signal to an external device through the antenna ANT. A control signal for controlling the operations of the processor 3100 or data to be processed by the processor 3100 may be entered as an input via the input device 3400, and the input device 3400 may include a pointing device, such as a touch pad and a computer mouse, a keypad, or a keyboard. The processor 3100 may control the operations of the display 3200 so that data which are outputted from the memory controller 1200, or data outputted from the radio transceiver 3300, or data outputted from the input device 3400 may be displayed via the display 3200. The memory system 30000 may also include one or more input/output ports which are operatively coupled to the processor 3100 for removably coupling communications cable and/or portable memory devices.

In accordance with an embodiment, the memory controller 1200 controlling the operations of the memory device 1100 may form part of the processor 3100, or may be formed as a separate chip from the processor 3100.

Figure 20:
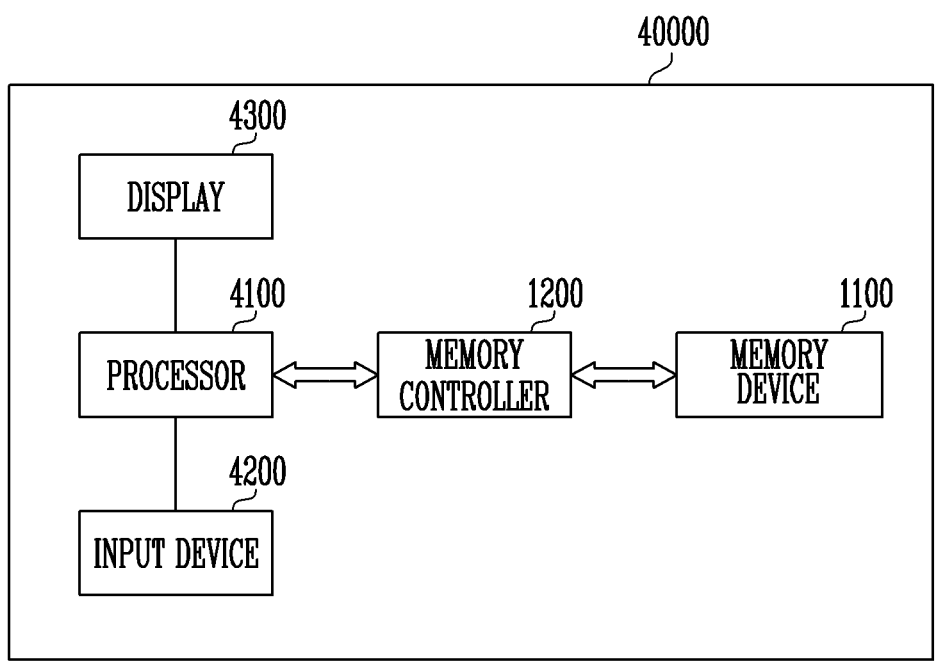
FIG. 20 is a diagram illustrating an embodiment of a memory system including a memory controller as shown in FIG. 2.

FIG. 20 is a diagram illustrating an embodiment (40000) of the memory system 1000 including the memory controller 1200 as shown in FIG. 2 and the memory device 1100.

Referring to FIG. 20, the memory system 40000 may be embodied into a personal computer (PC), a tablet PC, a net-book, an e-reader, a personal digital assistant (PDA), a portable multimedia player (PMP), an MP3 player, or an MP4 player.

The memory system 40000 may include the memory device 1100 and the memory controller 1200 controlling a data processing operation of the memory device 1100.

A processor 4100 may output data stored in the memory device 1100 through a display 4300 according to data input through an input device 4200. Examples of the input device 4200 may include a pointing device such as a touch pad or a computer mouse, a keypad, or a keyboard.

The processor 4100 may control the general operations of the memory system 40000 and control the operations of the memory controller 1200. In accordance with an embodiment, the memory controller 1200 controlling the operations of the memory device 1100 may be part of the processor 4100, or be formed as a separate chip from the processor 4100.

Figure 21:
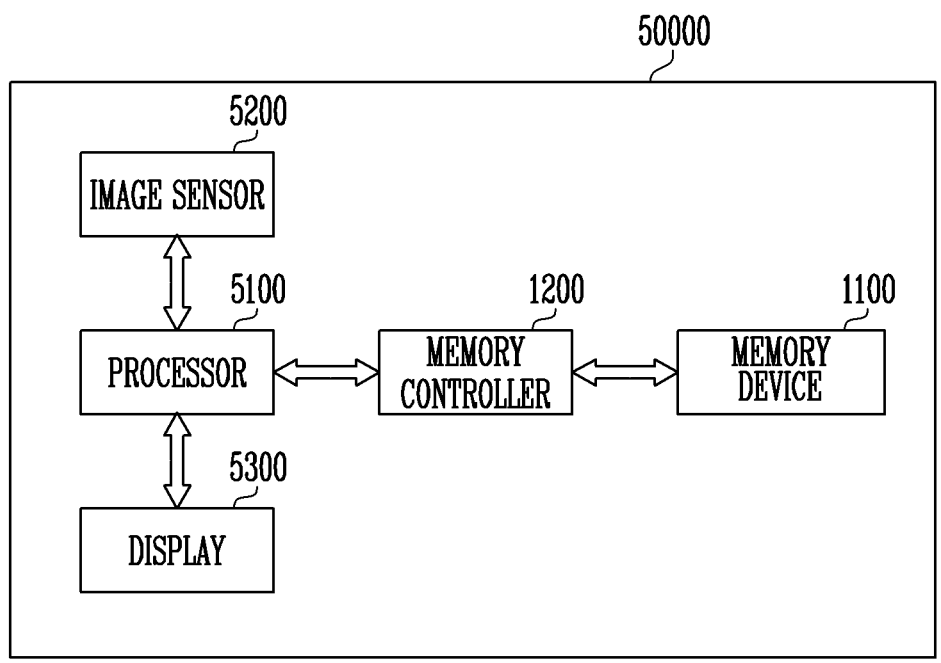
FIG. 21 is a diagram illustrating an embodiment of a memory system including a memory controller as shown in FIG. 2.

FIG. 21 is a diagram illustrating an embodiment (50000) of the memory system 1000 including the memory controller 1200 as shown in FIG. 2.

Referring to FIG. 21, a memory system 50000 may be provided as an image processing device, for example, a digital camera, a mobile phone attached with a digital camera, a smart phone attached with a digital camera, or a tablet PC attached with a digital camera.

The memory system 50000 may include the memory device 1100 and the memory controller 1200 controlling a data processing operation of the memory device 1100, for example, a program operation, an erase operation or a read operation.

An image sensor 5200 of the memory system 50000 may convert an optical image into digital signals, and the converted digital signals may be transferred to the processor 5100 or the memory controller 1200. In response to control of the processor 5100, the converted digital signals may be output through the display 5300 or stored in the semiconductor memory device 1100 through the memory controller 1200. In addition, the data stored in the memory device 1100 may be output through the display 5300 according to control of the processor 5100 or the memory controller 1200.

In accordance with an embodiment, the memory controller 1200 controlling the operations of the memory device 1100 may be part of the processor 5100, or be formed as a separate chip from the processor 5100.

Figure 22:
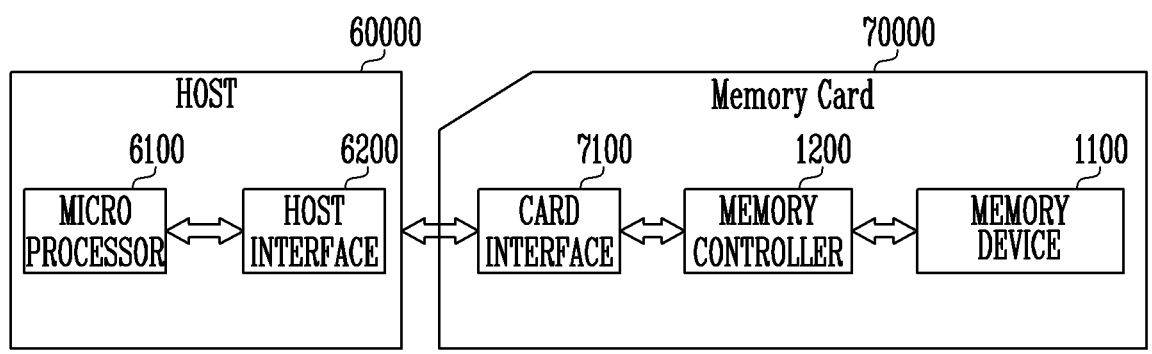
FIG. 22 is a diagram illustrating an embodiment of a memory system including a memory controller as shown in FIG. 2.

FIG. 22 is a diagram illustrating an embodiment (70000) of the memory system 1000 including the memory controller 1200 as shown in FIG. 2.

Referring to FIG. 22, a memory system 70000 may be a memory card or a smart card. The memory system 70000 may include the memory device 1100, the memory controller 1200, and a card interface 7100.

The memory controller 1200 may control a data exchange between the semiconductor memory device 1100 and the card interface 7100. In an embodiment, the card interface 7100 may be a secure digital (SD) card interface or a multi-media card (MMC) interface, but it is not limited thereto.

The card interface 7100 may interface a data exchange between the host 2000 and the memory controller 1200 according to a protocol of the host 2000. In accordance with an embodiment, the card interface 7100 may support a Universal Serial Bus (USB) protocol and an InterChip (IC)-USB protocol. The card interface may refer to hardware capable of supporting a protocol which is used by the host 60000, software installed in the hardware, or a signal transmission method.

In accordance with the present disclosure, performance of a memory system may be improved using a memory device queuing a plurality of commands.

Figure 23:
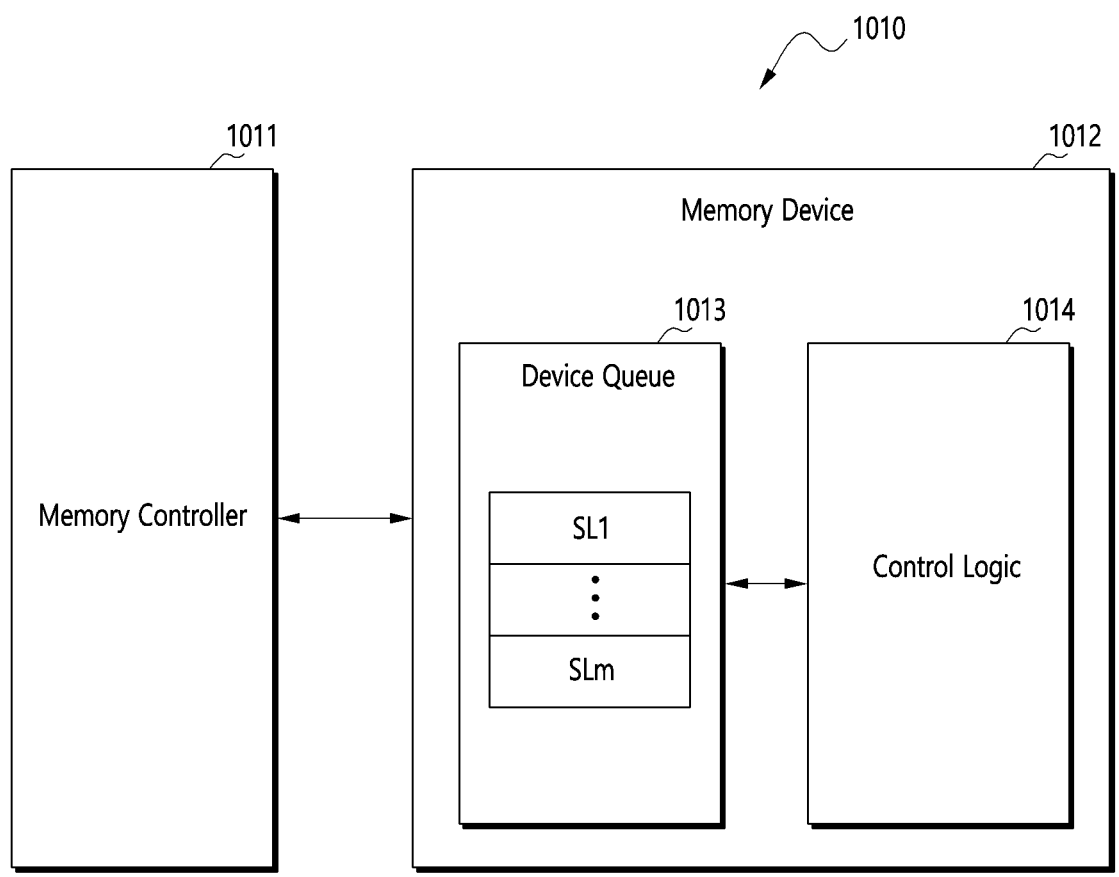
FIG. 23 is a block diagram illustrating a memory system 1010 in accordance with an embodiment.

FIG. 23 is a block diagram illustrating a memory system 1010 in accordance with an embodiment.

In general, a host may mix write and read requests, and transmit the mixed write and read requests to the memory system 1010. A memory device 1012 may support a program suspend function in order to reduce read latency on the host and to improve the QoS (Quality of Service). For example, while performing a program operation, the memory device 1012 may receive an interrupt from a memory controller 1011, the interrupt serving to instruct the memory device 1012 to suspend the program operation. In this case, the memory device 1012 may suspend the program operation, and preferentially perform a read operation in response to a read command transmitted from the memory controller 1011. However, since the process of suspending the program operation may also cause latency, frequent program suspending operations may have a bad influence on the performance of the memory system 1010. Furthermore, while the program operation is suspended and resumed, a voltage pump may be repeatedly turned on/off, and data may be set up. Thus, additional overhead may occur. However, in accordance with the present embodiment which will be described below, the memory device 1012 may support an auto-suspend function and a burst command processing function, and thus effectively reduce latency and overhead which are caused by a suspended program operation.

Specifically, the memory system 1010 may include the memory controller 1011 and the memory device 1012. The memory controller 1011 may be configured and operated in a similar manner to the memory controller 1200 of FIG. 1. The memory device 1012 may be configured and operated in a similar manner to the memory device 1100 of FIG. 1.

In an embodiment, the memory controller 1011 may set the mode of the memory device 1012. The mode of the memory device 1012 may include a burst mode, a separate mode and an abortion mode. The memory device 1012 may process commands queued in a device queue 1013 according to the mode set by the memory controller 1011. Specifically, in the burst mode, the memory device 1012 may perform a burst process on the same type of one or more commands at early positions in an order obtained by reordering the commands queued in the device queue 1013. The burst process may indicate a process of consecutively processing commands which are sequentially queued in a plurality of slots of the device queue 1013. In the separate mode, the memory device 1012 may process the command transmitted for the first time from the memory controller 1011, among the commands queued in the device queue 1013, or process the commands in an in-order manner. In the abortion mode, the memory device 1012 may change the status of a command, selected among the commands queued in the device queue 1013, to an abortion status, or flush the command. The memory controller 1011 may transmit a mode setting command to the memory device 1012 in order to set the mode of the memory device 1012. In the following embodiment, a set feature command will be used as the mode setting command. However, the present embodiment is not limited thereto. The set feature command may include mode information indicating a mode selected by the memory controller 1011.

In an embodiment, the memory controller 1011 may set the mode of the memory device 1012 based on the status of the memory device 1012. The memory controller 1011 may transmit a status confirm command to the memory device 1012 in order to confirm the status of the memory device 1012. In the following embodiment, a get feature command will be used as the status confirm command. However, the present embodiment is not limited thereto. The memory controller 1011 may confirm the status of the memory device 1012, and set the mode of the memory device 1012 according to the status of the memory device 1012. In particular, when transmitting a plurality of read commands to the memory device 1012 during a program operation as will described below, the memory controller 1011 may set the mode of the memory device 1012 to the burst mode such that the read commands are preferentially processed through a burst process.

The memory device 1012 may include the device queue 1013 and a control logic 1014. The device queue 1013 may be configured and operated in a similar manner to the device queue 610 of FIG. 6. The device queue 1013 may include a plurality of slots SL1 to SLm. The control logic 1014 may be configured and operated in a similar manner to the control logic 300 of FIG. 4.

In an embodiment, after a command queued in any one slot of the plurality of slots SL1 to SLm is processed, the device queue 1013 may flush the processed command from the corresponding slot, and reorder one or more commands remaining in the plurality of slots SL1 to SLm. In other words, whenever a command is processed, the device queue

1013 may flush the corresponding command. The device queue 1013 may reorder one or more commands according to a predetermined rule. For example, the predetermined rule may include assigning the highest priority to a read command or suspended command, assigning the second highest priority to a program command, and assigning the lowest priority to an erase command. When the mode is set to the burst mode, the device queue 1013 may reorder one or more commands remaining in the plurality of slots SL1 to SLm, after one or more commands processed through a burst process are all flushed. When the mode is set to the separate mode, the device queue 1013 may reorder one or more commands remaining in the plurality of slots SL1 to SLm, whenever a command is flushed. After the one or more commands are reordered, the device queue 1013 may enter a ready status to receive a get feature command and/or set feature command from the memory controller 1011.

In an embodiment, the device queue 1013 may transmit a report queue to the memory controller 1011 in response to the get feature command of the memory controller 1011. The report queue may include the status of the device queue 1013, a command execution status, an internal operation result and the like. The device queue 1013 may set the mode in response to the set feature command of the memory controller 1011.

In an embodiment, the control logic 1014 may set the mode in response to the set feature command of the memory controller 1011, and process the one or more commands, queued in the device queue 1013, according to the set mode. When the mode is set to the burst mode, the control logic 1014 may perform a burst process on the same type of one or more commands located at early positions, among the reordered one or more commands queued in the plurality of slots SL1 to SLm. When the mode is set to the separate mode, the control logic 1014 may process the command transmitted for the first time from the memory controller 1011, among the one or more commands queued in the plurality of slots SL1 to SLm.

In an embodiment, when the command processed for the last time before the set feature command is received from the memory controller 1011 is a read command, the control logic 1014 may output data, read by the read command, to the memory controller 1011 in response to the set feature command. The read data may be outputted in response to the set feature command, before another command is processed.

In an embodiment, when a first read command is queued into the device queue 1013 during a program operation, the control logic 1014 may suspend the program operation, and process the first read command. The operation of suspending the program operation and preferentially processing the first read command may be performed regardless of the current mode of the memory device 1012. The processing method after the first read command is processed may be changed according to the current mode. Specifically, when the mode is set to the burst mode at the point of time that the first read command is queued, the control logic 1014 may process the first read command, and then perform a burst process on one or more read commands which are sequentially queued in the device queue 1013, following the first read command. When the mode is set to the separate mode at the point of time that the first read command is queued, the control logic 1014 may process only the first read command, and enter the ready status without processing another command.

That is, in accordance with the present embodiment, the memory device 1012 may support the auto-suspend function of suspending a program operation when a read command is queued into the device queue 1013 during the program operation, even though no separate interrupt is provided from the memory controller 1011. In addition, the memory device 1012 may support the burst command processing function of consecutively processing the same type of one or more commands (specifically, read commands) queued in the device queue 1013, under control of the memory controller 1011. As a result, the memory device 1012 may effectively reduce latency and overhead which are caused by the suspended program operation.

FIGS. 24A to 24D are diagrams for describing a method in which the memory device 1012 supports the auto-suspend function and the burst command processing function, in accordance with the present embodiment.

Figure 24A:
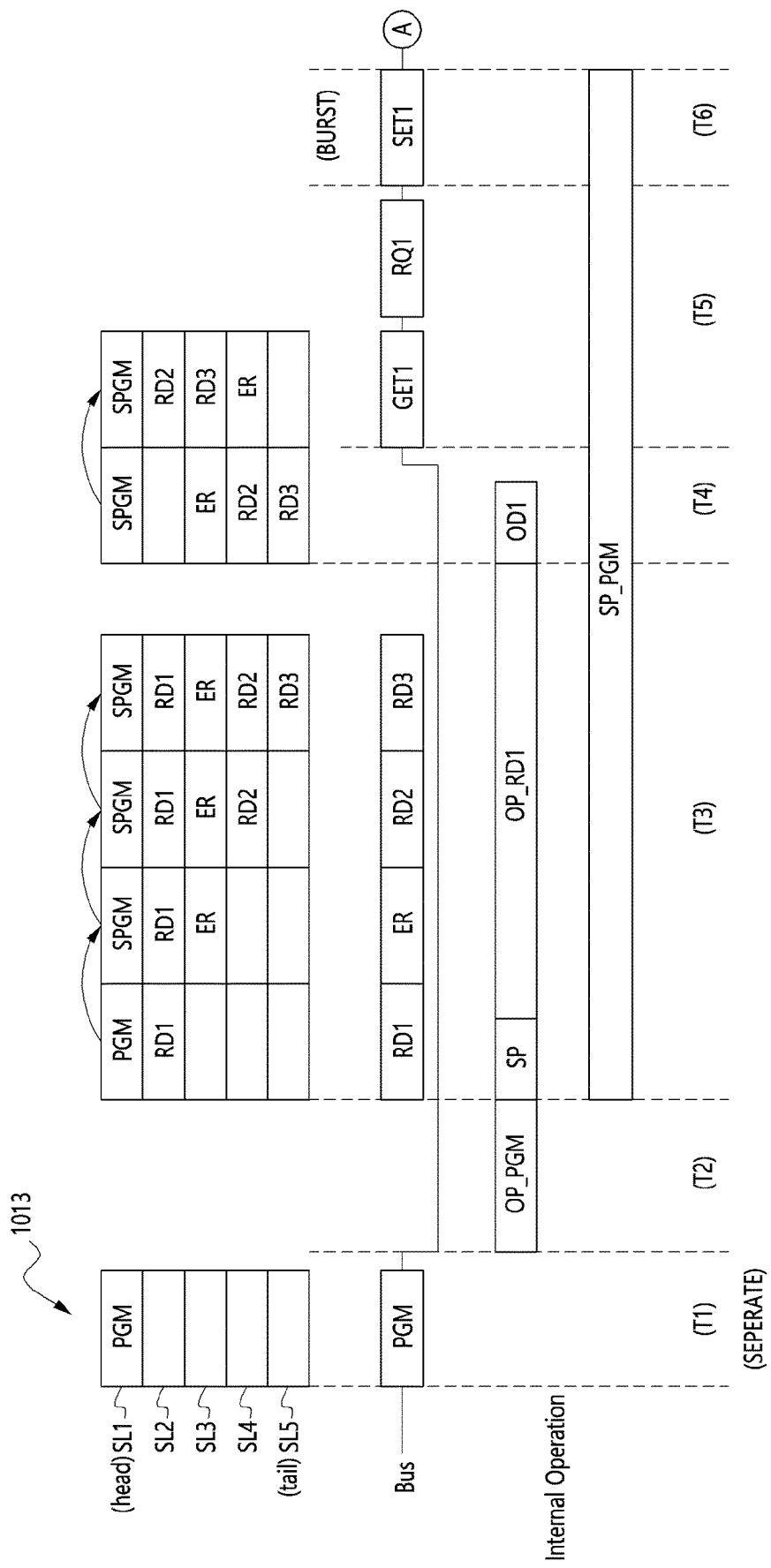
FIGS. 24A to 24D are diagrams for describing a method in which the memory device 1012 supports the auto-suspend function and the burst command processing function, in accordance with the present embodiment.

Referring to FIG. 24A, the device queue 1013 may include first to fifth slots SL1 to SL5 for storing five commands, respectively. For example, the first to fifth slots SL1 to SL5 may each include a device address queue slot corresponding to the device address queue 620 of FIG. 9 and a device command queue slot corresponding to the device command queue 630 of FIG. 10. The device queue 1013 may queue a maximum of five commands, but the present embodiment is not limited thereto.

A command queue structure, i.e. the structure of a command queued in the controller command queue 711 or the device queue 1013 has be configured in the same or similar manner as or to the command queue structure described with reference to FIG. 7. In an embodiment, device queue information included in the command queue structure may include information indicating whether the corresponding command is processed in the burst mode or the separate mode, or has been aborted.

In a time period T1, the mode of the memory device 1012 may be set to the separate mode, for example. For example, although not illustrated, the memory controller 1011 may transmit the set feature command to the memory device 1012 to set the mode of the memory device 1012 to the separate mode, before the time period T1. The memory controller 1011 may transmit a program command PGM to the memory device 1012 through a bus. The program command PGM may include a command indicating a program operation, the corresponding address, and data to be programmed. The device queue 1013 may receive the program command PGM, and queue the program command PGM into a first slot SL1. For example, the queue command execution control circuit 670 of FIG. 10 may queue the program command PGM into the first slot SL1 according to the method described with reference to FIGS. 9 and 10.

In a time period T2, the control logic 1014 may perform a program operation OP_PGM based on the program command PGM queued in the first slot SL1. For example, the queue command execution control circuit 670 of FIG. 10 may control the path of the program command PGM, queued in the first slot SL1, according to the method described with reference to FIGS. 9 and 10, such that the control logic 1014 performs the program operation OP_PGM. When a line corresponding to the bus in FIG. 24A goes down, it indicates that the memory device 1012 is performing an internal operation (e.g. busy status). The memory controller 1011 may determine whether the memory device 1012 is performing an internal operation, through various publicly-known methods, for example, a read/busy signal, a read status command and the like.

In a time period T3, the memory controller 1011 may transmit a first read command RD1 to the memory device 1012. In other words, even through the memory device 1012 is performing the program operation OP_PGM, the memory controller 1011 may transmit the first read command RD1 to the memory device 1012. The first read command RD1 may include a command indicating the read operation and the corresponding address. The device queue 1013 may queue the first read command RD1 into a second slot SL2 according to the method described with reference to FIGS. 9 and 10. The control logic 1014 may suspend the program operation OP_PGM through a suspend operation SP in response to the first read command RD1. In other words, the memory controller 1011 may not transmit an interrupt separately from the first read command RD1, the interrupt serving to instruct the control logic 1014 to suspend the program operation OP_PGM. The control logic 1014 may suspend the program operation OP_PGM in response to the first read command RD1, even though an interrupt to instruct the control logic 1014 to suspend the program operation OP_PGM is not received from the memory controller 1011. The suspended program operation SP_PGM may be retained as a background operation. The program command PGM queued in the first slot SL1 may be represented as a suspended program command SPGM. After suspending the program operation OP_PGM, the control logic 1014 perform a first read operation OP_RD1 based on the first read command RD1 queued in the second slot SL2.

The memory controller 1011 may sequentially transmit an erase command ER, a second read command RD2 and a third read command RD3 to the memory device 1012, following the first read command RD1. According to the method described with reference to FIGS. 9 and 10, the device queue 1013 may sequentially queue the erase command ER, the second read command RD2 and the third read command RD3 into third to five slots SL3 to SL5.

After the first read operation OP_RD1 is ended, the device queue 1013 may flush the first read command RD1 in a time period T4. For example, the queue command execution control circuit 670 of FIG. 10 may flush the first read command RD1. The device queue 1013 may re-order the remaining commands through a reordering operation OD1, based on predetermined priority criteria. According to the predetermined priority criteria, the read command or suspended command may have the highest priority, the program command PGM may have the second highest priority, and the erase command ER may have the lowest priority. However, such priority criteria are only an example, and various priority criteria may be set in advance. For example, the device queue 1013 may reorder the suspended program command PGM, the erase command ER, the second read command RD2 and the third read command RD3 such that the commands are arranged in order of the suspended program command PGM, the second read command RD2, the third read command RD3 and the erase command ER. Since the suspended program operation SP_PGM is being executed as a background operation until the suspended program operation SP_PGM is resumed, the suspended program operation SP_PGM may have the highest priority with the read operation in the priority criteria, and retain the existing priority even in the device queue 1013. For example, the queue command execution control circuit 670 of FIG. 10 may reorder the commands queued in the device queue 1013. The queue command execution control circuit 670 may shift the commands according to the order of the commands reordered in the device address queue 620 of FIG. 9 and the device command queue 630 of FIG. 10. The device queue 1013 may enter the ready status after the reordering operation OD1.

In a time period T5, the memory controller 1011 may check that the memory device 1012 has entered the ready status or the internal operation was ended, and transmit a get feature command GET1 to the memory device 1012 in order to check the status of the memory device 1012. The device queue 1013 may transmit a report queue RQ1 to the memory controller 1011 in response to the get feature command GET1, the report queue RQ1 including the status of the device queue 1013, a command execution status, an internal operation result (e.g. success) and the like. For example, the queue command execution control circuit 670 of FIG. 10 may transmit the report queue RQ1 to the memory controller 1011.

In a time period T6, the memory controller 1011 may select the mode of the memory device 1012 based on the report queue RQ1 transmitted from the memory device 1012. For example, the memory controller 1011 may transmit a set feature command SET1 to the memory device 1012 in order to set the mode of the memory device 1012 to the burst mode. For example, the memory controller 1011 may transmit the set feature command SET1, similar to that described with reference to FIG. 16, to the memory device 1012. For example, the memory controller 1011 may include mode information in the position of the information P3 of the set feature command SET1 illustrated in FIG. 16, the mode information indicating the burst mode. The device queue 1013 may set the mode to the burst mode in response to the set feature command SET1. For example, the queue command execution control circuit 670 of FIG. 10 may set the mode to the burst mode.

Figure 24B:
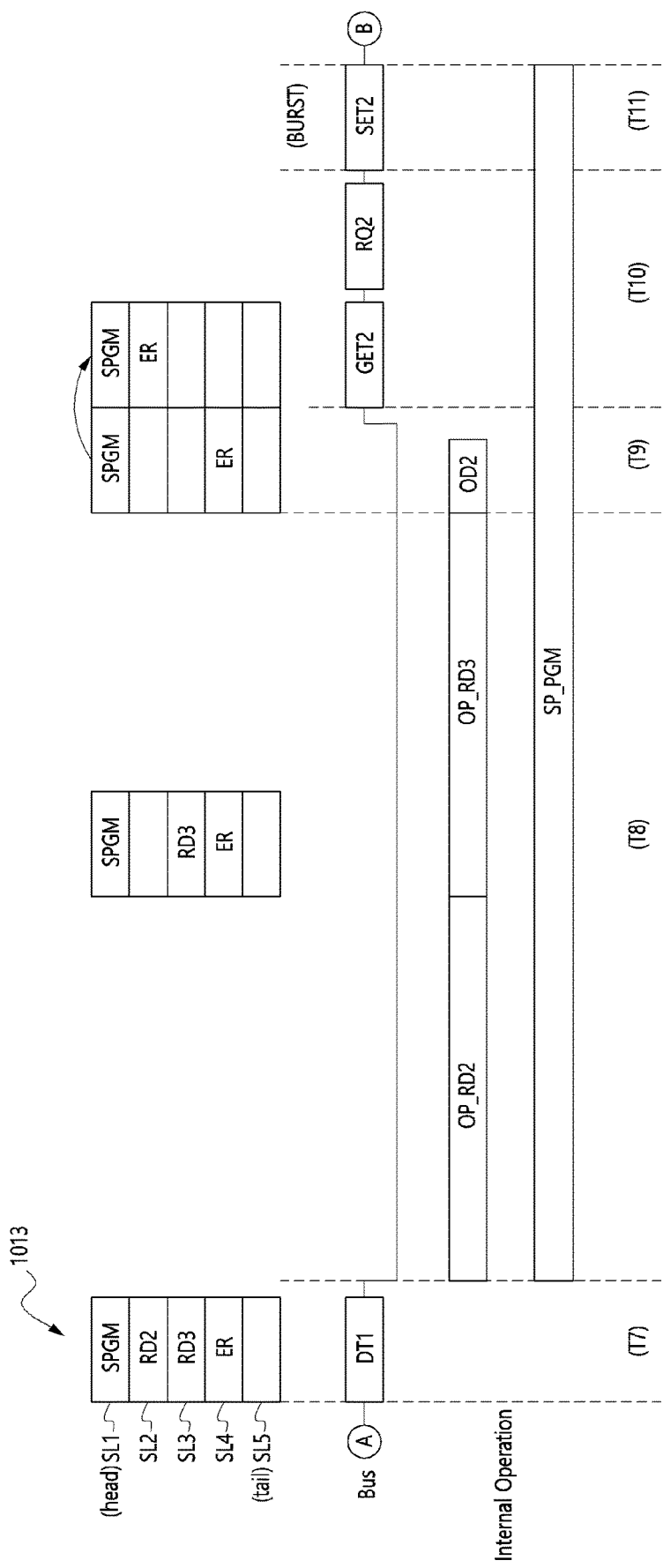
Figure 24C:
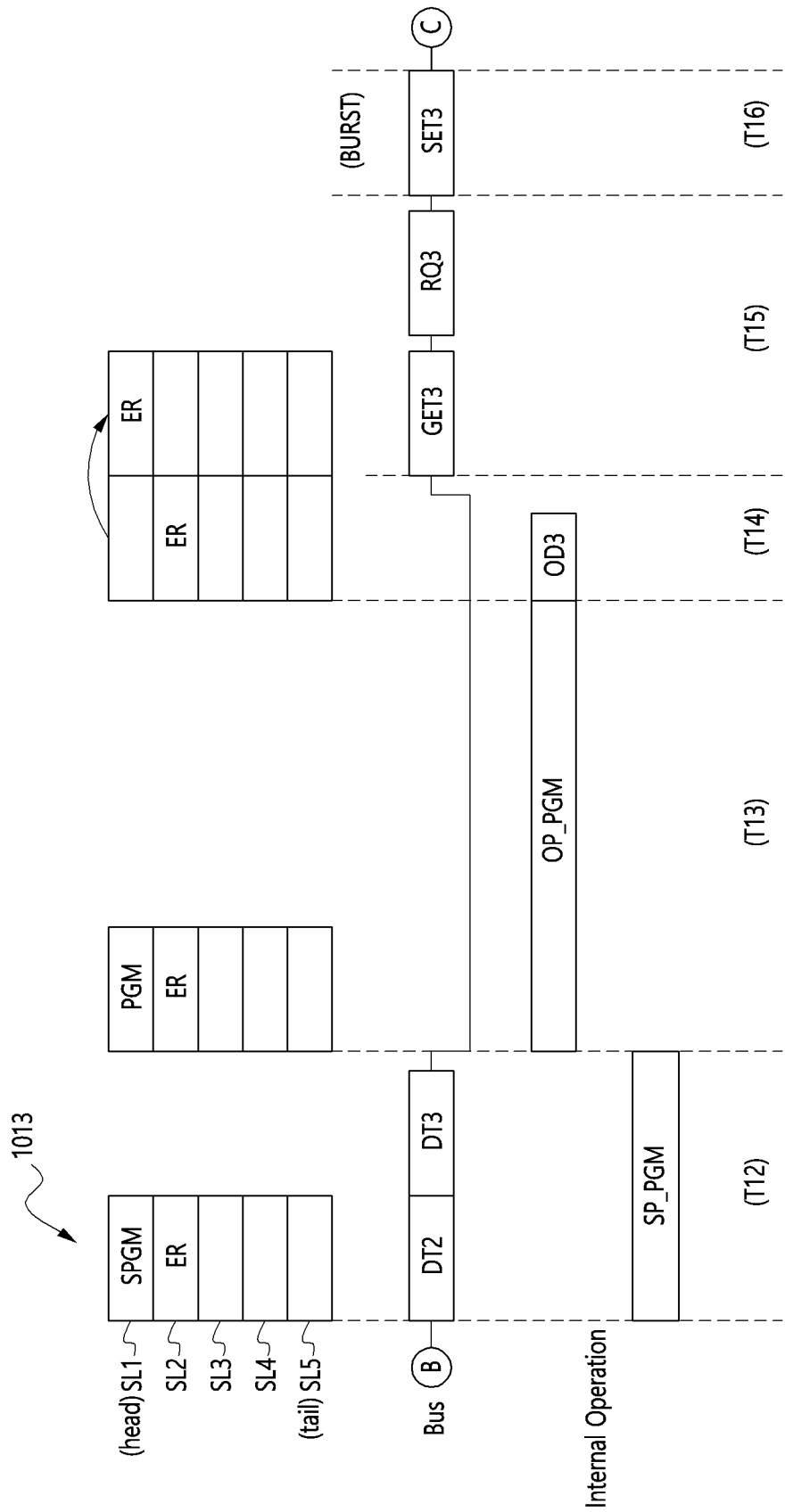
Figure 24D:
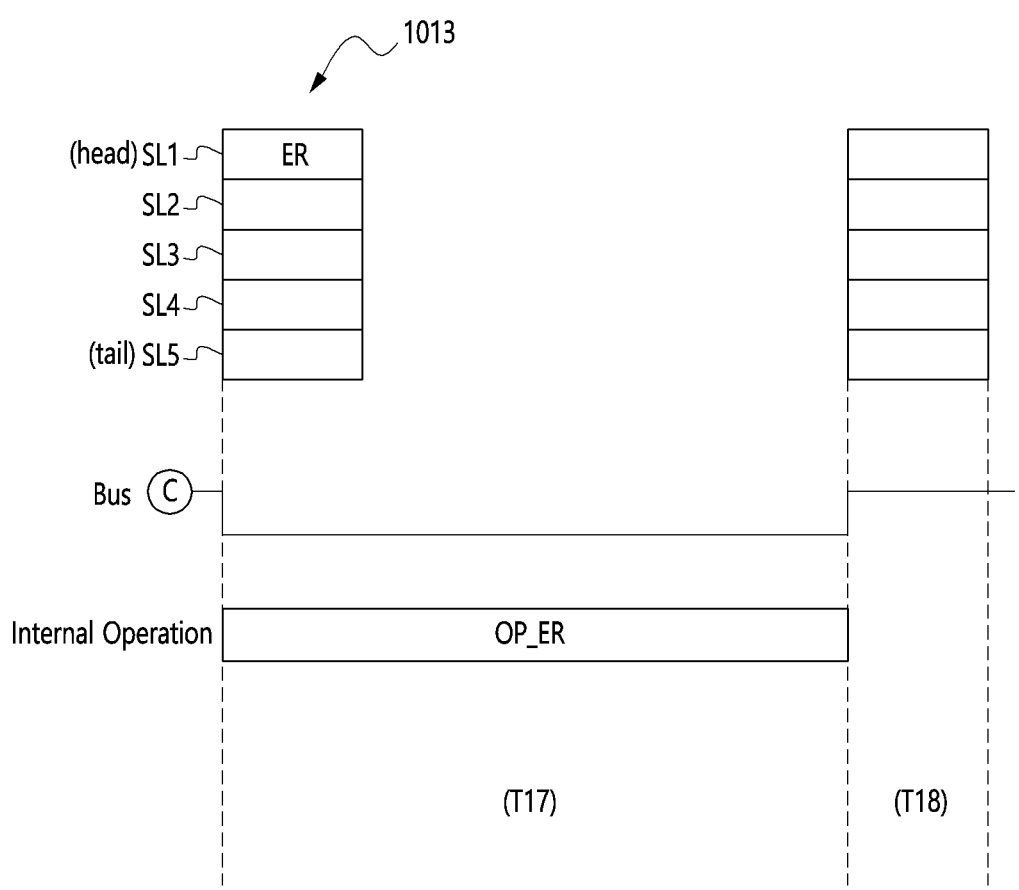

Referring to FIG. 24B, the control logic 1014 may output first data DT1, read through a first read operation OP_RD1, to the memory controller 1011 in response to the set feature command SET1, in a time period T7.

In a time period T8, the control logic 1014 may perform a second read operation OP_RD2 based on the second read command RD2 queued in the second slot SL2, according to the order of the reordered commands. The suspended program operation SP_PGM may be continuously retained as a background operation. After the second read operation OP_RD2 is ended, the device queue 1013 may flush the second read command RD2 from the second slot SL2. Then, the control logic 1014 may consecutively perform a third read operation OP_RD3 following the second read operation OP_RD2 (i.e. in the burst mode), based on the third read command RD3 queued in the third slot SL3. That is, the control logic 1014 may process the same type of commands (i.e. the second and third read commands RD2 and RD3), which are located at early positions in the order of the reordered commands, through a burst process. Since the erase command ER queued in the fourth slot SL4 is a different type of command from the second and third read commands RD2 and RD3, the erase command ER may not be processed through the burst process.

After the third read operation OP_RD3 is ended, the device queue 1013 may flush the third read command RD3 from the third slot SL3 in a time period T9. Since the second and third read commands RD2 and RD3 processed through the burst process were all flushed, the device queue 1013 may reorder the remaining commands through a reordering operation OD2 based on predetermined priority criteria. For example, the device queue 1013 may reorder the commands in order of the suspended program command SPGM and the erase command ER, based on the priority criteria. That is, since there are no commands which are additionally transmitted from the memory controller 1011 in the time periods T5 to T9, the reordering operation in the time period T9 may be only performed to move the suspended program command SPGM and the erase command ER to the first and second slots SL1 and SL2. The device queue 1013 may enter the ready status after the reordering operation OD2.

In a time period T10, the memory controller 1011 may check that the memory device 1012 has entered the ready status or the internal operation was ended, and transmit a get feature command GET2 to the memory device 1012. The device queue 1013 may transmit a report queue RQ2 to the memory controller 1011 in response to the get feature command GET2. The report queue RQ2 may include a read operation result (e.g. success).

In a time period T11, the memory controller 1011 may select the mode of the memory device 1012 based on the report queue RQ2 transmitted from the memory device 1012. The memory controller 1011 may transmit a set feature command SET2 to the memory device 1012 such that the mode of the memory device 1012 is set to the burst mode, for example. The device queue 1013 may set the mode to the burst mode in response to the set feature command SET2.

In a time period T12, the control logic 1014 may output second data DT2 and third data DT3, read through the second read operation OP_RD2 and the third read operation OP_RD3, to the memory controller 1011 in response to the set feature command SET2.

In a time period T13, the control logic 1014 may resume the program operation OP_PGM based on the suspended program command SPGM queued in the first slot SL1. In other words, the control logic 1014 may resume the suspended program operation SP_PGM in response to the set feature command SET2, even though a separate command to instruct the control logic 1014 to resume the program operation OP_PGM is not received from the memory controller 1011. The device queue 1013 may change the status of the program command SPGM queued in the first slot SL1. Since the mode is set to the burst mode, the suspended program command SPGM at an early position in the device queue may be preferentially processed, and the erase command ER queued in the second slot SL2 may not be processed through a burst process, because the erase command ER is a different type of command from the program command PGM.

After the program operation OP_PGM is ended, the device queue 1013 may flush the program command PGM from the first slot SL1 in a time period T14. The device queue 1013 may reorder the remaining commands through a reordering operation OD3, based on predetermined priority criteria. Since there are no commands which are additionally transmitted from the memory controller 1011 in the time periods T10 to T14, the erase command ER may be simply moved to the first slot SL1. The device queue 1013 may enter the ready status after the reordering operation OD3.

In a time period T15, the memory controller 1011 may check that the memory device 1012 has entered the ready status or the internal operation was ended, and transmit a get feature command GET3 to the memory device 1012. The device queue 1013 may transmit a report queue RQ3 to the memory controller 1011 in response to the get feature command GET3. The report queue RQ3 may include a program operation result (e.g. success).

In a time period T16, the memory controller 1011 may select the mode of the memory device 1012 based on the report queue RQ3 transmitted from the memory device 1012. The memory controller 1011 may transmit a set feature command SET3 to the memory device 1012 such that the mode of the memory device 1012 is set to the burst mode, for example. The device queue 1013 may set the mode to the burst mode in response to the set feature command SET3.

In a time period T17, the control logic 1014 may perform an erase operation OP_ER based on the erase command ER queued in the first slot SL1, in response to the set feature command SET3.

After the erase operation is ended, the device queue 1013 may flush the erase command ER from the first slot SL1 in a time period T18. Although not illustrated, the memory controller 1011 may confirm that the internal operation of the memory device 1012 was ended, and transmit a get feature command to the memory device 1012. The device queue 1013 may transmit a report queue to the memory controller 1011 in response to the get feature command.

Unlike the above-described example, the memory controller 1011 may set the mode of the memory device 1012 to the separate mode through the set feature command SET1 in the time period T6. In this case, the control logic 1014 may ignore the order of the reordered commands, and process the command transmitted for the first time from the memory controller 1011, among the commands queued in the device queue 1013. As a result, when the mode is set to the separate mode through the set feature command SET1, the control logic 1014 may not process the second and third read commands RD2 and RD3 through a burst process, but process the erase command ER.

Unlike the above-described example, the device queue 1013 may transmit a report queue including failure information to the memory controller 1011, when the internal operation fails. The memory controller 1011 may re-queue the command, related to the failed internal operation, into the controller command queue (e.g. 711 of FIG. 6) by referring to the failure information included in the report queue.

Figure 25A:
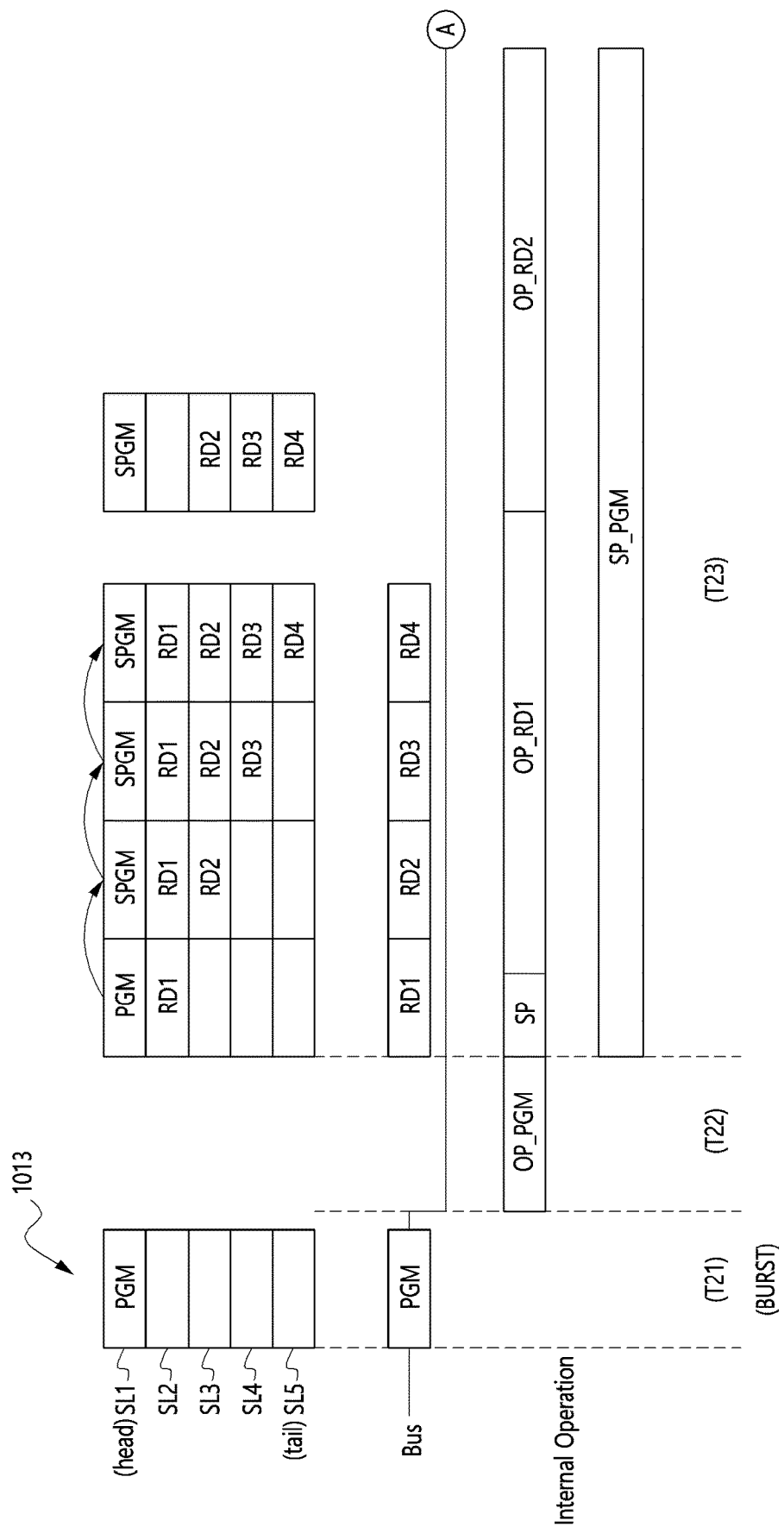
FIGS. 25A to 25C are diagrams for describing a method in which the memory device 1012 supports the auto-suspend function and the burst command processing function, in accordance with an embodiment.
Figure 25B:
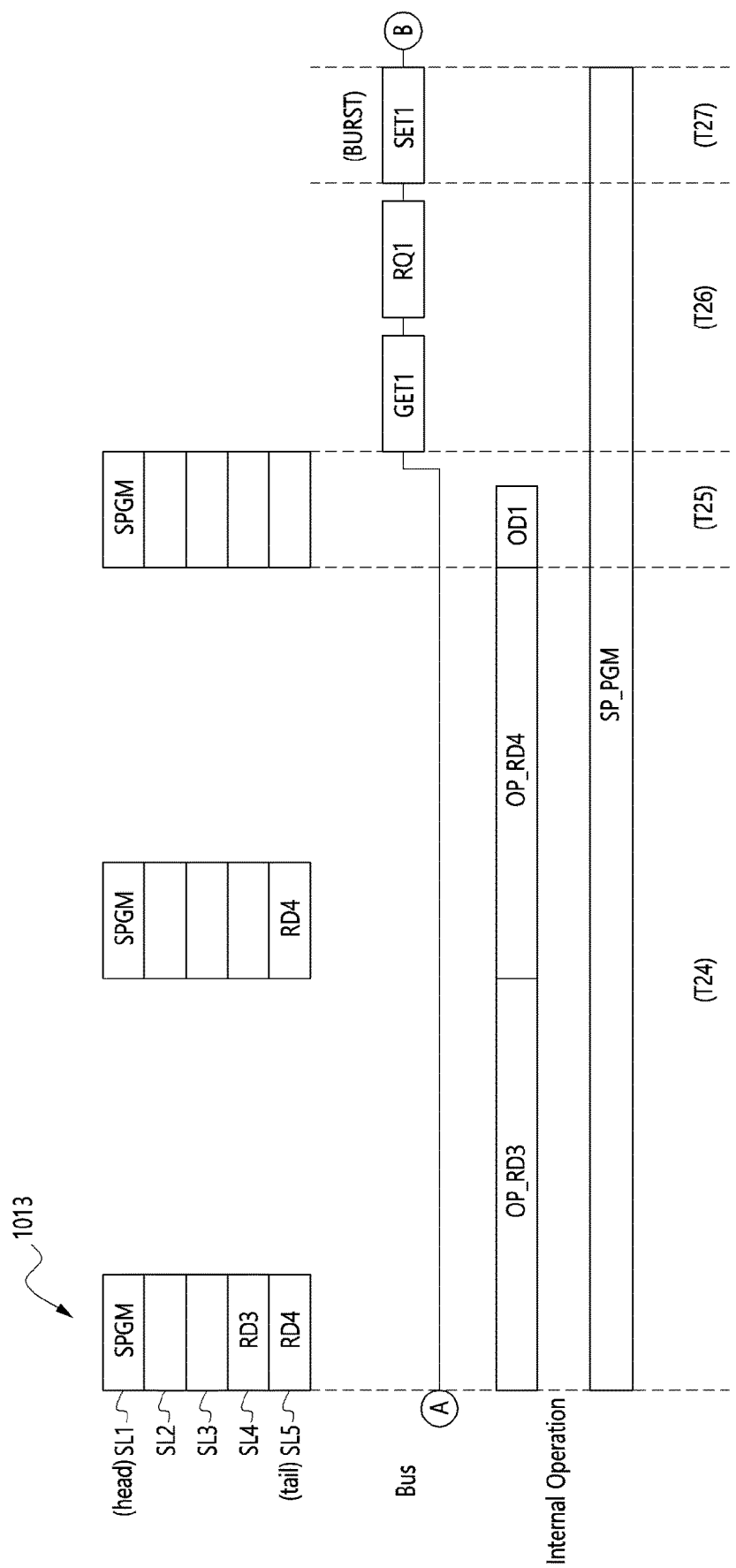
Figure 25C:
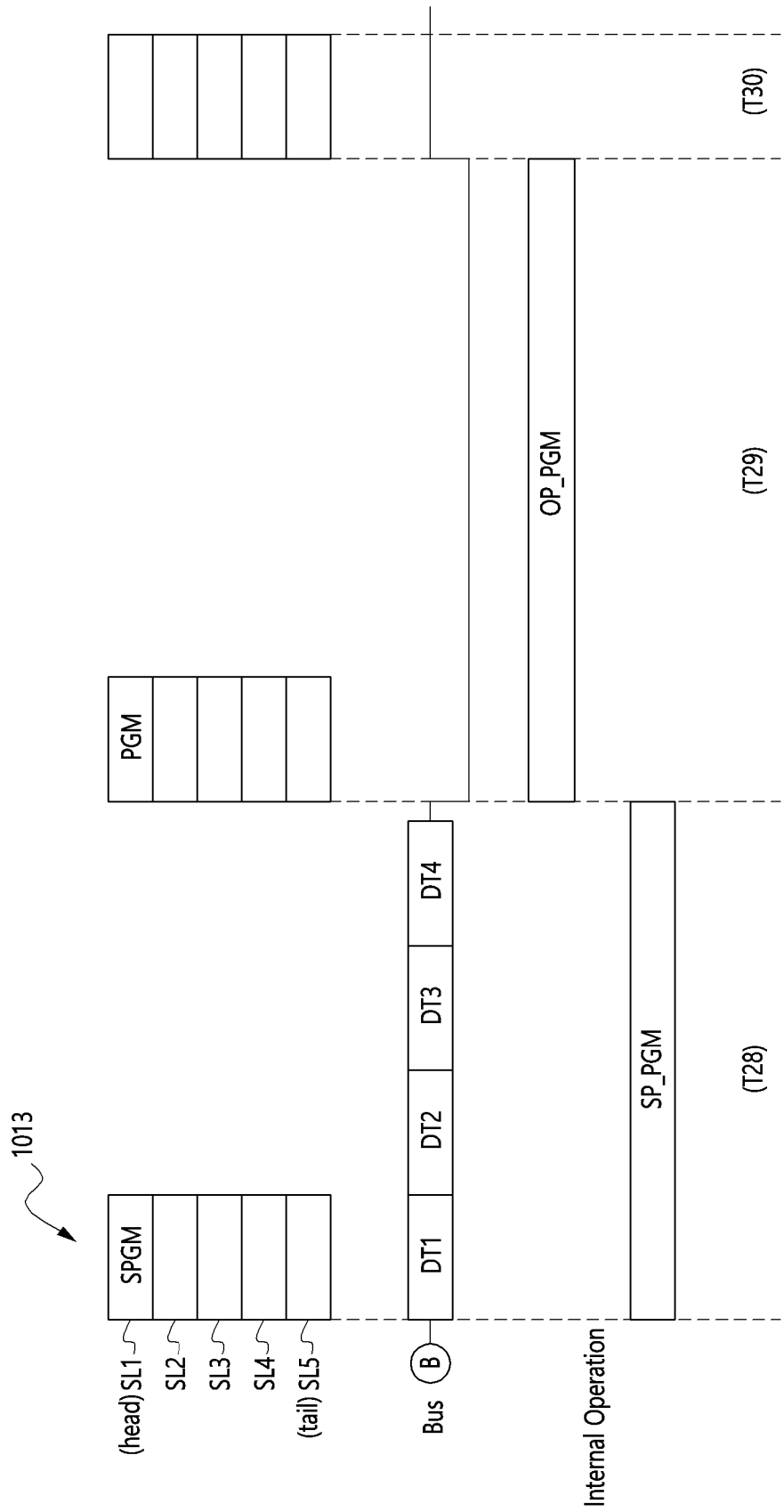

FIGS. 25A to 25C are diagrams for describing a method in which the memory device 1012 supports the auto-suspend function and the burst command processing function, in accordance with an embodiment.

Referring to FIG. 25A, the mode of the memory device 1012 may be already set to the burst mode in a time period T21, unlike in the time period T1 of FIG. 24A. For example, although not illustrated, the memory controller 1011 may transmit a set feature command to the memory device 1012 to set the mode of the memory device 1012 to the burst mode, before the time period T21.

The memory controller 1011 may transmit a program command PGM to the memory device 1012 through a bus. The device queue 1013 may receive the program command PGM, and queue the program command PGM into the first slot SL1.

In a time period T22, the control logic 1014 may perform a program operation OP_PGM based on the program command PGM queued in the first slot SL1.

In a time period T23, the memory controller 1011 may transmit a first read command RD1 to the memory device 1012. The device queue 1013 may queue the first read command RD1 into the second slot SL2. The control logic 1014 may suspend the program operation OP_PGM through a suspend operation SP in response to the first read command RD1, and perform a first read operation OP_RD1. Furthermore, the memory controller 1011 may sequentially transmit a second read command RD2, a third read command RD3 and a fourth read command RD4 to the memory device 1012, following the first read command RD1. The device queue 1013 may sequentially queue the second to fourth read commands RD2 to RD4 into the third to fifth slots SL3 to SL5.

After the first read operation OP_RD1 is ended, the device queue 1013 may flush the first read command RD1 from the second slot SL2. Then, the control logic 1014 may consecutively perform a second read operation OP_RD2 following the first read operation OP_RD1 (i.e. in the burst mode), based on the second read command RD2 queued in the third slot SL3.

Referring to FIG. 25B, the device queue 1013 may flush the second read command RD2 from the third slot SL3 in a time period T24 after the second read operation OP_RD2 is ended. Then, the control logic 1014 may consecutively perform a third read operation OP_RD3 following the second read operation OP_RD2 (i.e. in the burst mode), based on the third read command RD3 queued in the fourth slot SL4. After the third read operation OP_RD3 is ended, the device queue 1013 may flush the third read command RD3 from the fourth slot SL4. Then, the control logic 1014 may consecutively perform a fourth read operation OP_RD4 following the third read operation OP_RD3 (i.e. in the burst mode), based on the fourth read command RD4 queued in the fifth slot SL5. In other words, in the burst mode, the control logic 1014 may process the same type of commands (i.e. the first to fourth read commands RD1 to RD4) which are located at early positions in the order, through a burst process.

After the fourth read operation OP_RD4 is ended, the device queue 1013 may flush the fourth read command RD4 from the fifth slot SL5 in a time period T25. Since the first to fourth read commands RD1 to RD4 processed through the burst process were all flushed, the device queue 1013 may reorder the remaining commands through a reordering operation OD1 based on the priority criteria. The reordering operation OD1 may include only retaining the suspended program command SPGM as it is.

In a time period T26, the memory controller 1011 may confirm that the memory device 1012 has entered the ready status or the internal operation was ended, and transmit a get feature command GET1 to the memory device 1012. The device queue 1013 may transmit a report queue RQ1 to the memory controller 1011 in response to the get feature command GET1. The report queue RQ1 may include a read operation result (e.g. success).

In a time period T27, the memory controller 1011 may select the mode of the memory device 1012 based on the report queue RQ1 transmitted from the memory device 1012. The memory controller 1011 may transmit a set feature command SET1 to the memory device 1012 such that the mode of the memory device 1012 is set to the burst mode, for example. The device queue 1013 may set the mode to the burst mode in response to the set feature command SET1.

Referring to FIG. 25C, the control logic 1014 may output first to fourth data DT1 to DT4, read through the first to fourth read operations OP_RD1 to OP_RD4, to the memory controller 1011 in response to the set feature command SET1, in a time period T28.

In a time period T29, the control logic 1014 may resume the program operation OP_PGM based on the suspended program command SPGM queued in the first slot SL1. The device queue 1013 may change the status of the program command SPGM queued in the first slot SL1.

After the program operation OP_PGM is ended, the device queue 1013 may flush the program command PGM from the first slot SL1 in a time period T30.

It will be apparent to those skilled in the art that various modifications can be made to the above-described exemplary embodiments of the present invention without departing from the spirit or scope of the invention. Thus, it is intended that the present invention cover all such modifications provided they come within the scope of the appended claims and their equivalents.

What is claimed is:

1. A memory system comprising:
   a memory device comprising a device queue and a buffer; and
   a memory controller configured to communicate with the memory device through a corresponding way among a plurality of ways and include a plurality of way command queues respectively corresponding to the plurality of ways,
   wherein the device queue queues a plurality of commands received from a corresponding way command queue among the plurality of way command queues, and
   wherein the memory device performs an internal operation at least including continuously performing a plurality of read operations respectively corresponding to a plurality of read commands queued in the device queue to store read data respectively corresponding to the plurality of read operations in the buffer and then outputs all of the read data from the buffer to the memory controller after continuously performing the plurality of read operations, under control of the memory controller.

2. The memory system according to claim 1, wherein when a mode is set to a burst mode at a point of time that a read command is queued, the memory device processes the read command, and then continuously processes one or more read commands which are sequentially queued in the device queue, following the processed read command.

3. The memory system according to claim 1, wherein when a mode is set to a separate mode at a point of time that a read command is queued, the memory device processes only the read command, and enters a ready status without processing another command.

4. The memory system according to claim 1, wherein whenever processing each of the plurality of read commands, the memory device flushes the processed read command from the device queue, and,
   wherein when one or more commands remain in the device queue after the plurality of read commands are all flushed, the memory device reorders the one or more commands remaining in the device queue.

5. The memory system according to claim 4, wherein the memory device reorders the one or more commands remaining in the device queue, and then enters a ready status to receive a set feature command from the memory controller.

6. The memory system according to claim 1, wherein the memory controller transmits a get feature command to the memory device to confirm an internal operation result, and transmits a set feature command to the memory device to set a mode when the internal operation result indicates that the internal operation has successfully ended.

7. The memory system according to claim 6, wherein the memory device outputs the read data to the memory controller in response to the set feature command.

8. The memory system according to claim 6, wherein when the mode is set to a burst mode, the memory device continuously processes the same type of one or more commands, which are in front of a command of a different type in an order obtained by reordering one or more commands queued in the device queue.

9. The memory system according to claim 6, wherein when the mode is set to a separate mode, the memory device processes a command transmitted for the first time from the memory controller, among one or more commands queued in the device queue.

10. The memory system according to claim 1, wherein the memory device corresponds to the plurality of commands queued to the device queue and a plurality of commands queued to the corresponding way command queue.

11. A memory system comprising:
a memory device comprising a device queue; and
a memory controller configured to communicate with the memory device through a corresponding way among a plurality of ways and include a plurality of way command queues respectively corresponding to the plurality of ways,
wherein the device queue queues a plurality of commands received from a corresponding way command queue among the plurality of way command queues, and
wherein the memory device continuously processes the same type of one or more commands, which are in front of a command of a different type in an order obtained by reordering the plurality of commands when a mode is set to a burst mode.

12. The memory system according to claim 11,
wherein when the mode is set to a separate mode, the memory device processes a command transmitted for the first time from the corresponding way command queue, among the plurality of commands.

13. The memory system according to claim 11, wherein when the mode is set to the burst mode, the device queue flushes each command of the one or more commands whenever each command is processed, and,
wherein when one or more remaining commands exist in the device queue after the one or more commands are all flushed, the memory device reorders the one or more remaining commands.

14. The memory system according to claim 11, wherein when the mode is set to a separate mode, the memory device flushes a command after the command is processed, and,
wherein when one or more remaining commands exist in the device queue after the command is flushed, the memory device reorders the one or more remaining commands.

15. The memory system according to claim 11, wherein after reordering the plurality of commands, the memory device enters a ready status to receive a mode setting command from the memory controller.

16. The memory system according to claim 15, wherein when a command last processed before the mode setting command is received is a read command, the memory device outputs data, read by the read command, to the memory controller in response to the mode setting command.

17. The memory system according to claim 15, wherein the memory device processes the plurality of commands according to a mode set by the mode setting command.

18. The memory system according to claim 11, wherein the memory device reorders the plurality of commands according to predetermined criteria,
wherein the predetermined criteria comprise assigning the highest priority to a read command.

19. The memory system according to claim 11, wherein when a read command is queued into the device queue while a program operation is performed, the memory device suspends the program operation, and processes the read command.

20. A memory system comprising:
a memory device comprising a device queue comprising a plurality of slots; and
a memory controller configured to communicate with the memory device through a corresponding way among a plurality of ways and include a plurality of way command queues respectively corresponding to the plurality of ways,
wherein the device queue queues a plurality of commands received from a corresponding way command queue among the plurality of way command queues, and
wherein after a plurality of read commands queued in the device queue are processed, the memory device reorders one or more commands remaining in the device queue,
and then outputs all of data, read by the plurality of read commands, to memory controller according to control of the memory controller.

21. The memory system according to claim 20, wherein the memory device reorders the one or more commands according to predetermined criteria,
wherein the predetermined criteria comprise assigning the highest priority to a read command.

22. The memory system according to claim 20, wherein after reordering the one or more commands, the memory device enters a ready status to receive a mode setting command from the memory controller.

23. The memory system according to claim 22, wherein the memory device outputs the data to the memory controller in response to the mode setting command.

24. The memory system according to claim 22, wherein the memory device processes the one or more commands according to a mode set by the mode setting command.

25. The memory system according to claim 20, wherein when a mode is set to a burst mode, the memory device continuously processes the same type of one or more commands, which are in front of a command of a different type in an order obtained by reordering the one or more commands.

26. The memory system according to claim 20, wherein when a mode is set to a separate mode, the memory device processes a command transmitted for the first time from the corresponding way command queue, among the one or more commands.

27. The memory system according to claim 20, wherein when a read command is queued into the device queue while a program operation is performed, the memory device suspends the program operation, and processes the read command.

* * * * *